US012779978B2

(12) United States Patent
Hu et al.

(10) Patent No.: US 12,779,978 B2
(45) Date of Patent: Nov. 3, 2026

(54) SELF-PROPELLED DEVICE

(71) Applicant: Nanjing Chervon Industry Co., Ltd., Nanjing (CN)

(72) Inventors: Chenglong Hu, Nanjing (CN); Yazhou Geng, Nanjing (CN); Haishen Xu, Nanjing (CN); Yicong Chen, Nanjing (CN); Qiqi Yin, Nanjing (CN); Chao Meng, Nanjing (CN); Huixing Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 379 days.

(21) Appl. No.: 18/358,703

(22) Filed: Jul. 25, 2023

(65) Prior Publication Data

US 2024/0059138 A1 Feb. 22, 2024

(30) Foreign Application Priority Data

Aug. 17, 2022 (CN) ........................ 202210987025.X
Sep. 1, 2022 (CN) ......................... 202211066921.9
(Continued)

(51) Int. Cl.
*B60K 7/00* (2006.01)
*A01D 34/00* (2006.01)
(Continued)

(52) U.S. Cl.
CPC .......... *B60K 7/0007* (2013.01); *A01D 34/008* (2013.01); *A01D 34/64* (2013.01);
(Continued)

(58) Field of Classification Search
CPC .... B60K 7/0007; A01D 34/008; A01D 34/64; A01D 2101/00; A01D 69/02
See application file for complete search history.

(56) References Cited

U.S. PATENT DOCUMENTS

2009/0005939 A1 1/2009 Dueckinghaus
2012/0217079 A1* 8/2012 Besler ..................... B60B 35/16
403/361
(Continued)

FOREIGN PATENT DOCUMENTS

CN 101383540 A 12/2010
CN 108099583 A * 6/2018 ........... B60K 7/0007
(Continued)

OTHER PUBLICATIONS

CN 112806165 translation (Year: 2021).*
(Continued)

*Primary Examiner* — Timothy Hannon
(74) *Attorney, Agent, or Firm* — Greenberg Traurig, LLP

(57) ABSTRACT

A self-propelled device includes a cutting assembly for cutting vegetation; a body for supporting the cutting assembly; and a traveling system for driving the body to move. The traveling system includes at least a traveling wheel; and a wheel hub motor integrally disposed in the traveling wheel. Along an axial direction of the traveling wheel, the first external dimension of the self-propelled device is greater than or equal to 0.2 m and less than or equal to 1.5 m. Along a direction perpendicular to the axial direction of the traveling wheel, the second external dimension of the self-propelled device is greater than or equal to 0.5 m and less than or equal to 1.5 m.

12 Claims, 18 Drawing Sheets

(30) Foreign Application Priority Data

| | | |
|---|---|---|
| Sep. 1, 2022 | (CN) | 202211066923.8 |
| Sep. 1, 2022 | (CN) | 202211067847.2 |

(51) Int. Cl.

| | |
|---|---|
| ***A01D 34/64*** | (2006.01) |
| ***A01D 69/02*** | (2006.01) |
| *A01D 101/00* | (2006.01) |

(52) U.S. Cl.

CPC .......... *A01D 69/02* (2013.01); *A01D 2101/00* (2013.01); *B60K 2007/0092* (2013.01)

(56) References Cited

U.S. PATENT DOCUMENTS

| | | | | |
|---|---|---|---|---|
| 2018/0056775 | A1 * | 3/2018 | Fukudome | B60K 17/043 |
| 2019/0106126 | A1 * | 4/2019 | Hashimoto | F16H 57/0471 |
| 2025/0185536 | A1 * | 6/2025 | Hjelmaker | A01D 34/78 |

FOREIGN PATENT DOCUMENTS

| | | | | | |
|---|---|---|---|---|---|
| CN | 211741924 | U | * | 10/2020 | A01D 34/69 |
| CN | 112806165 | A | | 5/2021 | |
| CN | 112806166 | A | | 5/2021 | |
| CN | 213245770 | U | | 5/2021 | |
| CN | 113243190 | A | | 8/2021 | |
| CN | 114243957 | A | * | 3/2022 | H02K 1/165 |
| CN | 110915404 | B | | 9/2022 | |
| DE | 202009002353 | U1 | | 6/2009 | |
| KR | 102370522 | B1 | | 3/2022 | |
| WO | 2019206198 | A1 | | 10/2019 | |
| WO | 2021115364 | A1 | | 6/2021 | |

OTHER PUBLICATIONS

CN 211741924 translation (Year: 2020).*
CN 108099583 translation (Year: 2018).*
CN 213245770 translation (Year: 2021).*

* cited by examiner

SELF-PROPELLED DEVICE

RELATED APPLICATION INFORMATION

This application claims the benefit under 35 U.S.C. § 119(a) of Chinese Patent Application No. CN 202210987025.X, filed on Aug. 17, 2022, Chinese Patent Application No. CN 202211066921.9, filed on Sep. 1, 2022, Chinese Patent Application No. CN 202211066923.8, filed on Sep. 1, 2022, and Chinese Patent Application No. CN 202211067847.2, filed on Sep. 1, 2022, which applications are incorporated herein by reference in their entireties.

TECHNICAL FIELD

The present application relates to the technical field of mechanical control and, in particular, to a self-propelled device.

BACKGROUND

With the development of automated control technologies, smart devices have been widely promoted in the fields of family life and industrial production. As a smart robot integrated with functions such as autonomous movement and mowing, a smart mower greatly improves the efficiency of the garden and urban greening maintenance.

In the existing smart mower, a traveling electric motor and a cutting electric motor are generally disposed in the housing of the body, and the built-in traveling electric motor drives the traveling wheels to travel through a drive assembly such as a gear drive mechanism. The existing body mechanism has the following problems: the body volume is relatively large, and the drive assembly between the traveling electric motor and the traveling wheels increases the weight of the body and the complexity of installation. In the garden greening scenario, the large-volume and large-weight mower is inconvenient to use and move, affecting the user experience.

SUMMARY

A self-propelled device includes a cutting assembly for cutting vegetation; a body for supporting the cutting assembly; and a traveling system for driving the body to move. The traveling system includes at least a traveling wheel; and a wheel hub motor integrally disposed in the traveling wheel. The radial length of the wheel hub motor is greater than or equal to 18 cm and less than or equal to 33 cm; and the axial thickness of the wheel hub motor is less than or equal to 3.5 cm.

In an example, the self-propelled device further includes a connector for detachably mounting the wheel hub motor on a housing of the body, where the connector includes a mounting hole, a first end surface facing a side of the traveling wheel, and a second end surface facing away from the side of the traveling wheel, and the inner diameter of the mounting hole mates with the outer diameter of an output shaft of the wheel hub motor.

In an example, a limiting mechanism is disposed between the output shaft of the wheel hub motor and the connector and used for preventing a relative displacement from being generated between the output shaft and the connector, where the relative displacement includes an axial displacement and/or a circumferential displacement.

In an example, the limiting mechanism includes at least one of the following: at least one platform portion, at least one step portion, at least one protrusion, at least one groove portion, and at least one radial dimension gradient portion, where the at least one platform portion extends along an axial direction, is disposed in at least part of a region of the output shaft and the connector, and is used for limiting the circumferential displacement.

In an example, the limiting mechanism further includes an end surface limiting member, where the end surface limiting member is disposed on the second end surface, the end surface limiting member engages with and is fixed to a first groove of the output shaft, and the first groove is located at a projection of the second end surface on the output shaft.

In an example, the limiting mechanism further includes a rigid limiting member, where the rigid limiting member is detachably fixed to the housing of the body through a mounting assembly and fixed to the output shaft.

In an example, the self-propelled device further includes a sealing mechanism, where the sealing mechanism includes at least a first sealing mechanism, where the first sealing mechanism is disposed on a side of the output shaft facing the first end surface and used for sealing a contact surface between the connector and the output shaft.

In an example, the sealing mechanism further includes a second sealing mechanism, where the second sealing mechanism is disposed between the connector and the housing of the body and used for sealing a contact surface between the connector and the housing.

In an example, the self-propelled device includes a left traveling wheel and a right traveling wheel, where the distance between an outer end surface of a left wheel hub motor integrally disposed in the left traveling wheel and an outer end surface of a right wheel hub motor integrally disposed in the right traveling wheel is greater than the cutting width of the cutting assembly.

In an example, the output power of the wheel hub motor is greater than or equal to 1 W.

In an example, the cutting assembly includes a cutting electric motor, where along the axial direction of the traveling wheel, the distance between the cutting electric motor and the wheel hub motor is greater than zero and less than half of the first external dimension; and along the direction perpendicular to the axial direction of the traveling wheel, the distance between the cutting electric motor and the wheel hub motor is greater than or equal to zero and less than the second external dimension.

In an example, the number of magnetic pole pairs of the wheel hub motor is greater than or equal to 26 pairs.

In an example, the mechanical angle between any two adjacent magnetic poles of the wheel hub motor is less than or equal to 6.9°.

In an example, the energy density of the wheel hub motor is greater than or equal to 0.05 W/cm$^3$ and less than or equal to 0.5 W/cm$^3$.

In an example, when the overall weight of the self-propelled device is greater than or equal to 10 kg and less than or equal to 20 kg, the width of a hub is greater than or equal to 3 cm and less than or equal to 4 cm; when the overall weight is greater than 20 kg and less than or equal to 40 kg, the axial thickness of the wheel hub is greater than 4 cm and less than or equal to 6 cm; and when the overall weight is greater than 40 kg and less than or equal to 60 kg, the axial thickness of the wheel hub is greater than 6 cm and less than or equal to 9 cm.

A self-propelled device includes a cutting assembly for cutting vegetation; a body for supporting the cutting assembly; and a traveling system for driving the body to move. The traveling system includes at least a traveling wheel; and a wheel hub motor integrally disposed in the traveling wheel. Along an axial direction of the traveling wheel, the first external dimension of the self-propelled device is greater than or equal to 0.2 m and less than or equal to 1.5 m. Along a front and rear direction perpendicular to the axial direction of the traveling wheel, the second external dimension of the self-propelled device is greater than or equal to 0.5 m and less than or equal to 1.5 m.

In an example, the cutting assembly includes a cutting electric motor, where along the axial direction of the traveling wheel, the distance between the cutting electric motor and the wheel hub motor is greater than zero and less than half of the first external dimension; and along the front and rear direction perpendicular to the axial direction of the traveling wheel, the distance between the cutting electric motor and the wheel hub motor is greater than or equal to zero and less than the second external dimension.

A self-propelled device includes a cutting assembly for cutting vegetation; a body for supporting the cutting assembly; and a traveling system for driving the body to move. The traveling system includes at least a traveling wheel; a wheel hub motor integrally disposed in the traveling wheel; and a control circuit used for controlling an operation state of the wheel hub motor. The control circuit includes a driver circuit including multiple switching elements and used for driving the wheel hub motor to operate; a detection circuit used for acquiring an operation parameter of the wheel hub motor; and a controller connected to the driver circuit and outputting a control signal according to the operation parameter to change a conduction state of each of the multiple switching elements and control the rotational speed of the wheel hub motor to be greater than or equal to 8 rpm.

In an example, the control circuit is a field-oriented control (FOC) circuit, and the FOC circuit includes at least a current loop circuit and a speed loop circuit, where the current loop circuit is used for performing a closed-loop adjustment on an electric motor current or output torque of the wheel hub motor, and the speed loop circuit is used for performing a closed-loop adjustment on an electric motor rotational speed of the wheel hub motor.

In an example, the operation parameter includes a current parameter fed back from the detection circuit to the current loop circuit, the current parameter is a continuously changing smooth parameter and determined based on a rotor position parameter of the wheel hub motor, and detection accuracy of the rotor position parameter is less than or equal to 2.3°.

In an example, the number of magnetic pole pairs of the wheel hub motor is greater than or equal to 26 pairs.

A push working machine includes a handle forming a grip for a user to hold; a wheel assembly including at least one wheel; and at least one drive motor at least partially disposed in the wheel and at least driving the wheel to move. The drive motor is a brushless motor. The total rated power P1 of the drive motor is less than or equal to 1000 W. The rated voltage U1 of the drive motor is greater than or equal to 12 V and less than or equal to 120 V. The rated voltage U2 of the push working machine is greater than or equal to 18 V. The efficiency η1 of the drive motor is greater than 70%.

In an example, the total rated power P1 of the drive motor is greater than or equal to 300 W and less than or equal to 1000 W.

In an example, the total rated power P1 of the drive motor is greater than or equal to 100 W and less than or equal to 1000 W.

In an example, the wheel includes a first rear wheel, the diameter D1 of the first rear wheel is greater than or equal to 4 inches and less than or equal to 22 inches; and/or the tire width W1 of the first rear wheel is greater than or equal to 3 inches; and/or the hub diameter D2 of the first rear wheel is less than or equal to the diameter D1 of the first rear wheel; and/or the hub thickness T1 of the first rear wheel is greater than or equal to 3 inches.

In an example, the traveling speed of the first rear wheel is less than or equal to 2 m/s.

In an example, the overall weight of the push working machine is less than or equal to 150 kg.

In an example, the rotational speed of the drive motor is greater than or equal to 10 rpm and less than or equal to 380 rpm.

In an example, the drive motor is a wheel hub motor; the stack length of the wheel hub motor is greater than or equal to 30 mm and less than or equal to 200 mm; and/or the outer diameter of the wheel hub motor is greater than or equal to 100 mm and less than or equal to 550 mm.

In an example, the rotational speed of the wheel hub motor is less than or equal to 400 rpm; and/or the torque of the wheel hub motor is less than or equal to 80 N·m.

In an example, the slot fill factor of the wheel hub motor in a varnished state is greater than 45%.

In an example, the wheel includes a second rear wheel, the diameter D3 of the second rear wheel is greater than or equal to 4 inches and less than or equal to 16 inches; and/or the tire width W2 of the second rear wheel is greater than or equal to 1.5 inches; and/or the hub diameter D4 of the second rear wheel is greater than or equal to 6 inches; and/or the hub thickness T2 of the second rear wheel is greater than or equal to 1.3 inches; and/or the traveling speed V3 of the second rear wheel is less than or equal to 2 m/s.

In an example, the rotational speed of the drive motor is greater than or equal to 15 rpm and less than or equal to 380 rpm.

In an example, the drive motor is a wheel hub motor; the stack length of the wheel hub motor is greater than or equal to 20 mm and less than or equal to 100 mm; and/or the outer diameter of the wheel hub motor is greater than or equal to 100 mm and less than or equal to 410 mm.

In an example, the rotational speed of the wheel hub motor is less than or equal to 400 rpm; and/or the torque of the wheel hub motor is less than or equal to 35 N·m.

In an example, the slot fill factor of the wheel hub motor in a varnished state is greater than 45%.

Another object of the present application is to provide an all-terrain vehicle, where the all-terrain vehicle has a simple structure, is easy to control, occupies little space, and has relatively low requirements for the assembly process.

To achieve this object, the present application adopts the technical solutions described below.

An all-terrain vehicle includes a wheel assembly including at least one wheel; an operating assembly used for a user to operate the all-terrain vehicle; and at least one drive motor at least partially disposed in the wheel and at least driving the wheel to move. The drive motor is a brushless motor. The total rated power P2 of the drive motor is greater than or equal to 10 kW. The efficiency η2 of the drive motor is greater than 70%.

In an example, the total rated power P2 of the drive motor is greater than or equal to 10 kW and less than or equal to 40 kW.

In an example, the wheel includes a third rear wheel, the diameter D5 of the third rear wheel is greater than or equal to 15 inches and less than or equal to 30 inches; and/or the tire width W3 of the third rear wheel is greater than or equal to 6 inches; and/or the hub diameter D6 of the third rear wheel is greater than or equal to 8 inches; and/or the hub thickness T3 of the third rear wheel is greater than or equal to 8 inches and less than or equal to 16 inches.

In an example, the traveling speed V4 of the third rear wheel is greater than or equal to 10 m/s and less than or equal to 20 m/s.

In an example, the overall weight of the all-terrain vehicle is greater than or equal to 1090 kg and less than or equal to 1290 kg, and the overall weight does not include the weight of a passenger.

In an example, the rotational speed of the drive motor is greater than or equal to 250 rpm and less than or equal to 1000 rpm.

In an example, the drive motor is a wheel hub motor; the stack length of the wheel hub motor is greater than or equal to 150 mm and less than or equal to 350 mm; and/or the outer diameter of the wheel hub motor is greater than or equal to 250 mm and less than or equal to 350 mm.

In an example, the rotational speed of the wheel hub motor is less than or equal to 1000 rpm; and/or the torque of the wheel hub motor is greater than or equal to 50 N·m and less than or equal to 600 N·m.

In an example, the slot fill factor of the wheel hub motor in a varnished state is greater than 45%.

Another object of the present application is to provide a power tool, where the power tool has a simple structure, is easy to control, occupies little space, and has relatively low requirements for the assembly process.

To achieve this object, the present application adopts the technical solutions described below.

A power tool includes an output assembly used for an operation; a body used for supporting the output assembly; an operating assembly used for a user to operate the power tool; a wheel assembly including at least one wheel; a seat used for the user to sit on; and at least one drive motor at least partially disposed in the wheel and at least driving the wheel to move. The drive motor is a brushless motor. The total rated power P3 of the drive motor is greater than or equal to 1000 W. The rated voltage U3 of the drive motor is greater than or equal to 12 V and less than or equal to 120 V. The rated voltage U4 of the power tool is greater than or equal to 18 V and less than or equal to 120 V. The efficiency η3 of the drive motor is greater than 70%.

In an example, the power tool is a riding device.

In an example, the output assembly includes a mowing assembly including a cutting blade rotatable around a rotation axis for cutting vegetation, and the body supports the cutting blade.

In an example, the wheel includes a fourth rear wheel, the diameter D7 of the fourth rear wheel is greater than or equal to 12 inches; and/or the tire width W4 of the fourth rear wheel is greater than or equal to 5 inches; and/or the hub diameter D8 of the fourth rear wheel is greater than or equal to 5 inches; and/or the hub thickness T4 of the fourth rear wheel is greater than or equal to 4 inches.

In an example, the traveling speed of the wheel is less than or equal to 5.6 m/s.

In an example, the overall weight of the power tool is less than or equal to 350 kg, and the overall weight does not include the weight of a passenger.

In an example, the rotational speed of the drive motor is greater than or equal to 9 rpm and less than or equal to 360 rpm.

In an example, the drive motor is a wheel hub motor; the stack length of the wheel hub motor is less than or equal to 300 mm; and/or the outer diameter of the wheel hub motor is greater than or equal to 200 mm.

In an example, the rotational speed of the wheel hub motor is less than or equal to 400 rpm; and/or the torque of the wheel hub motor is less than or equal to 500 N·m.

In an example, the slot fill factor of the wheel hub motor in a varnished state is greater than 45%.

BRIEF DESCRIPTION OF THE DRAWINGS

To illustrate technical solutions in examples of the present application more clearly, drawings used in the description of the examples are briefly described below. Apparently, the drawings described below illustrate only part of the examples of the present application, and those of ordinary skill in the art may obtain other drawings based on the drawings described below on the premise that no creative work is done.

DETAILED DESCRIPTION

Figure 1:
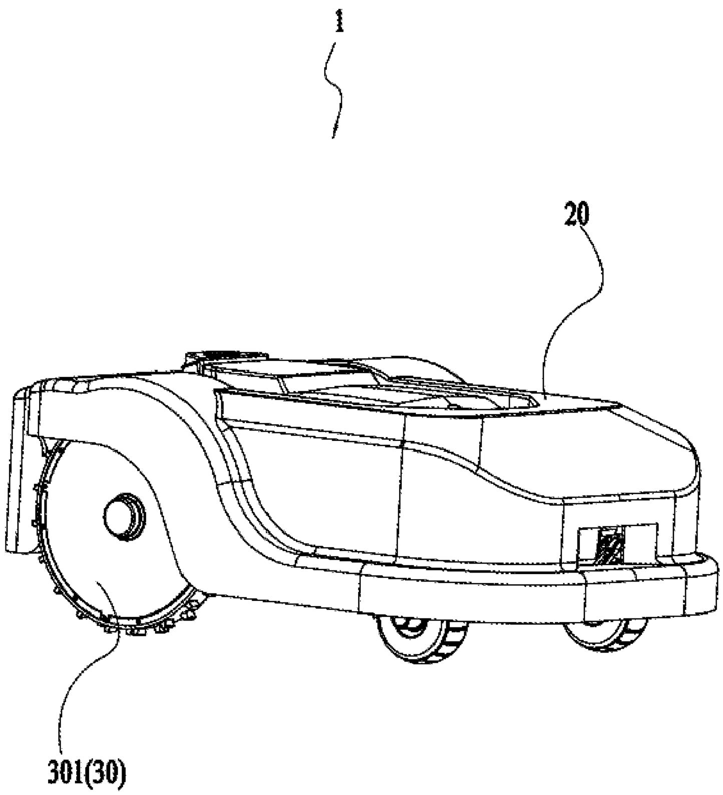
FIG. 1 is a structural view of a self-propelled device according to the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear”” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected “above” or “under” the other element, but can also be indirectly connected “above” or “under” the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms “controller”, “processor”, “central processor”, “CPU” and “MCU” are interchangeable. Where a unit “controller”, “processor”, “central processing”, “CPU”, or “MCU” is used to perform a specific function, the specific function may be implemented by a single aforementioned unit or a plurality of the aforementioned unit.

In this application, the term “device”, “module” or “unit” may be implemented in the form of hardware or software to achieve specific functions.

In this application, the terms “computing”, “judging”, “controlling”, “determining”, “recognizing” and the like refer to the operations and processes of a computer system or similar electronic computing device (e.g., controller, processor, etc.).

Figure 2:
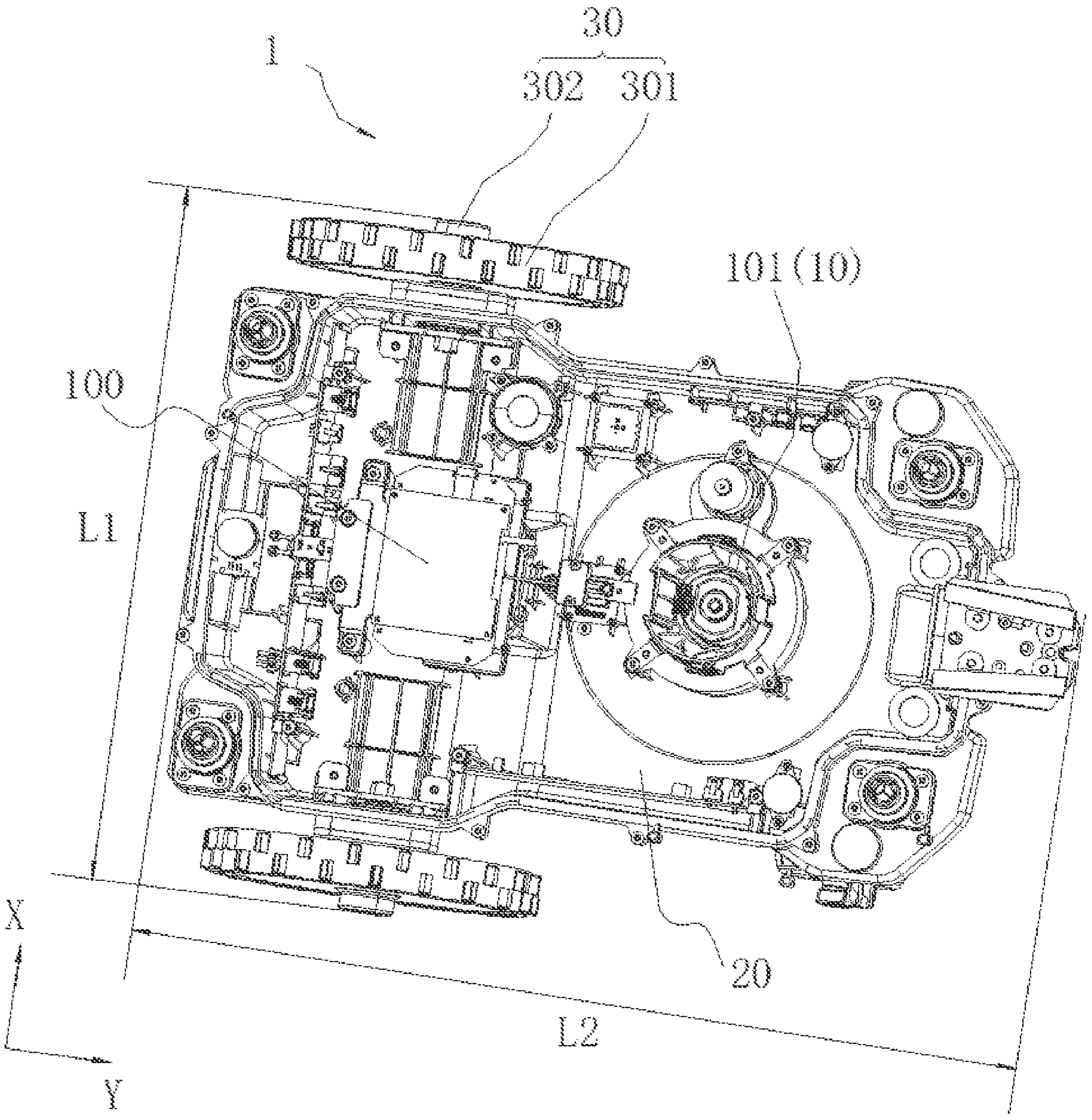
FIG. 2 is a top view of an internal mounting structure of the self-propelled device in FIG. 1.

FIG. 1 is a structural view of a self-propelled device according to the present application, and FIG. 2 is a top view of an internal mounting structure of the self-propelled device in FIG. 1. This example is applicable to a miniaturized and lightweight smart moving device, and the smart moving device may be used for outdoor working, for example, mowing vegetation such as lawns and weeds. In this example, a self-propelled device 1 may be a smart mower, and the smart mower may automatically perform the vegetation trimming operation without the human operation.

As shown in FIGS. 1 and 2, the self-propelled device 1 includes a cutting assembly 10 for cutting vegetation, a body 20 for supporting the cutting assembly 10, and a traveling system 30 for driving the body 20 to move. In this example, the body 20 includes a body housing and a chassis mechanism for protecting the self-propelled device 1, where the chassis mechanism may be used for fixing and supporting the cutting assembly 10.

As shown in FIG. 2, the cutting assembly 10 may include a cutting electric motor 101 and a cutting portion, where the cutting electric motor 101 drives the cutting portion to perform the vegetation cutting operation.

As shown in FIG. 2, the traveling system 30 includes at least a traveling wheel 301, a wheel hub motor 302 integrally disposed in the traveling wheel 301, and a control circuit 100 for controlling the operation state of the wheel hub motor 302. In this example, the self-propelled device 1 may be provided with two drive wheels and one driven wheel, and the wheel hub motor 302 is integrally disposed in each of the drive wheels on two sides, that is to say, the traveling wheel 301 into which the wheel hub motor 302 is integrated may be disposed on each side of the self-propelled device 1. The wheel hub motor 302 being integrally disposed in the traveling wheel 301 may be understood as the wheel hub motor 302 includes at least an electric motor body and an output shaft, where the electric motor body is partially disposed in the traveling wheel 301, and the output shaft is partially disposed in the traveling wheel 301 or partially protrudes to the outside of the traveling wheel 301. When the self-propelled device 1 is working, the wheel hub motor 302 directly drives the traveling wheel 301 to rotate, and the wheel hub motor 302 outputs the specific power to drive the traveling wheel 301 to rotate at an angle matching the output power, thereby controlling the self-propelled device 1 to move.

In conjunction with FIG. 2, along an axial direction X of the traveling wheel 301, the first external dimension L1 of the self-propelled device 1 is greater than or equal to 0.2 m and less than or equal to 1.5 m; and along a direction Y perpendicular to the axial direction of the traveling wheel 301, the second external dimension L2 of the self-propelled device 1 is greater than or equal to 0.5 m and less than or equal to 1.5 m. In an example, along a direction Z perpendicular to the axial direction of the traveling wheel 301, the third external dimension L3 of the self-propelled device 1 is greater than or equal to 0.1 m and less than or equal to 1 m.

In conjunction with FIG. 2, along the axial direction X of the traveling wheel, the first distance between the cutting electric motor 101 and the wheel hub motor 302 is greater than zero and less than half of the first external dimension L1; and along the direction Y perpendicular to the axial direction of the traveling wheel 301, the second distance between the cutting electric motor 101 and the wheel hub motor 302 is greater than or equal to zero and less than the second external dimension L2.

The first distance between the cutting electric motor 101 and the wheel hub motor 302 refers to the distance between the central axis of the cutting electric motor 101 and the end surface on a side of the wheel hub motor 302 facing the cutting electric motor 101. The second distance between the cutting electric motor 101 and the wheel hub motor 302 refers to the distance between the central axis of the cutting electric motor 101 and the central axis of the wheel hub motor 302.

In this example, the first external dimension L1 of the self-propelled device 1 may be used for indicating the maximum overall width of the self-propelled device 1. Typically, the first external dimension L1 may be the distance between the outer end surfaces of two wheel hub motors 302. The second external dimension L2 may be used for indicating the maximum overall length of the self-propelled device 1. Typically, the second external dimension L2 may be the distance between the front end surface of the body and the rear end surface of the body of the self-propelled device 1. On the premise of not changing the design dimensions of the original body 20, the dimensions of the wheel hub motor 302 and the output shaft of the wheel hub motor 302 match the overall width and length of the self-propelled device 1.

Specifically, the smart mower is used as an example, the overall width of the self-propelled device 1 in the axial direction X is 0.2 m to 1.5 m, the overall length of the self-propelled device 1 in the direction Y perpendicular to the axial direction is 0.5 m to 1.5 m, the wheel hub motor 302 is used to replace the traveling electric motor originally disposed in the body 20, the wheel hub motor 302 is detachably assembled into the traveling wheel 301, and the wheel hub motor 302 directly drives the traveling wheel 301 to rotate and operate, eliminating the need for a gearbox and other structures between the traveling electric motor and the traveling wheels, which is conducive to reducing the dimension and weight of the whole machine.

Optionally, in the present application, the distance between the outer end surfaces of the wheel hub motors 302 is greater than the cutting width of the cutting assembly 10. Specifically, two traveling wheels 301 each integrated with the wheel hub motor 302 may be arranged symmetrically on two sides of the self-propelled device 1, and the distance between the outer end surfaces of the wheel hub motors 302 on two sides is greater than the cutting width of the cutting assembly 10, which is conducive to improving the cutting quality while achieving safety protection.

Optionally, the rotational speed of the wheel hub motor 302 may be greater than or equal to 8 rpm, thereby achieving low-speed driving.

Optionally, the output power of the wheel hub motor 302 is greater than or equal to 1 W. In this example, the output power of the wheel hub motor 302 may be adjusted according to actual working conditions. For example, in the working condition of traveling on the flat ground, the output power of the wheel hub motor 302 is about 2.5 W to 3 W; and in the climbing condition, the output power of the wheel hub motor 302 may be 15 W.

Optionally, the wheel hub motor 302 in the present application has a flat structure. The external dimension of the wheel hub motor 302 matches the external dimension and the installation position of the traveling wheel 301. Since the traveling wheel 301 has a flat structure and the distance between the traveling wheel 301 and the housing of the body 20 is relatively small, the flat wheel hub motor 302 is conducive to adapting to the original shape and structure of the self-propelled device 1.

Figure 3:
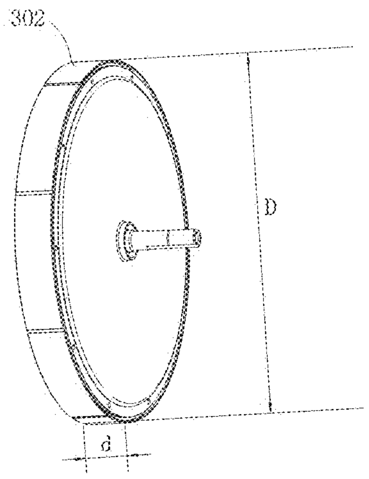
FIG. 3 is a structural view of a wheel hub motor according to the present application.

FIG. 3 is a structural view of a wheel hub motor according to the present application.

As shown in FIG. 3, the radial length D of the wheel hub motor 302 may be greater than or equal to 18 cm and less than or equal to 33 cm, and the axial thickness d of the wheel hub motor 302 is less than or equal to 3.5 cm. The radial length D and the axial thickness d of the wheel hub motor are adjusted so that the wheel hub motor 302 has a flat structure and can directly adapt to the original shape and structure of the self-propelled device 1, the change of the body housing caused by the replacement of the electric motor is avoided, and the structural versatility is strong.

Optionally, the wheel hub motor 302 may be made of materials such as aluminum, plastic, or steel.

Optionally, the energy density of the wheel hub motor 302 is greater than or equal to 0.05 $W/cm^3$ and less than or equal to 0.5 $W/cm^3$. The energy density of the electric motor refers to the ratio of the maximum output power of the wheel hub motor 302 to the weight, volume, or area of the entire wheel hub motor 302 or the self-propelled device 1. The greater the energy density of the wheel hub motor 302 is, the stronger the driving capability of the wheel hub motor 302 is. The energy density of the wheel hub motor is improved, which is conducive to ensuring the driving capability of the miniaturized and lightweight self-propelled device.

Optionally, the heat dissipation area of the wheel hub motor 302 may be 50 $cm^2$ to 300 $cm^2$. The heat dissipation area of the wheel hub motor 302 refers to the surface area of the winding part of the stator windings of the wheel hub motor 302. In this example, the heat dissipation area of the electric motor may be optimized by adjusting the number of turns, wire diameter, or winding density of the stator windings, and the heat dissipation capability of the wheel hub motor 302 is improved while the wheel hub motor 302 is flattened, which is conducive to improving the working efficiency of the wheel hub motor 302, improving the performance of the wheel hub motor, and improving the driving capability of the self-propelled device.

Optionally, the slot fill factor of the wheel hub motor 302 is greater than 45%. The slot fill factor refers to the proportion of space in the slot occupied by the stator windings of the wheel hub motor 302 after being put into the electrode slot. In this example, the slot fill factor of the wheel hub motor 302 may be adjusted by reducing the thickness of the insulating material or changing the number of wires and windings. The slot fill factor of the wheel hub motor 302 is improved and the energy loss caused by windings and temperature rise of the electric motor are reduced, which is conducive to improving the working efficiency of the wheel hub motor 302, improving the performance of the wheel hub motor, and improving the driving capability of the self-propelled device.

It is to be noted that, in the present application, the slot fill factor of the wheel hub motor 302 also matches the power supply voltage of the wheel hub motor 302.

Optionally, the number of magnetic pole pairs of the wheel hub motor 302 is greater than or equal to 26 pairs; or the mechanical angle between any two adjacent magnetic poles of the wheel hub motor 302 is less than or equal to 6.9°, thereby improving the rotor position detection accuracy of the electric motor.

Optionally, the axial thickness of the wheel hub of the wheel hub motor 302 is positively correlated with the overall weight of the self-propelled device 1 to match the requirements of different devices and different working conditions and provide electric motor adaptability, which is conducive to simplifying the assembly process.

In an example, when the overall weight is greater than or equal to 10 kg and less than or equal to 20 kg, the axial thickness of the wheel hub is greater than or equal to 3 cm and less than or equal to 4 cm; when the overall weight is greater than 20 kg and less than or equal to 40 kg, the axial thickness of the wheel hub is greater than 4 cm and less than or equal to 6 cm; and when the overall weight is greater than 40 kg and less than or equal to 60 kg, the axial thickness of the wheel hub is greater than 6 cm and less than or equal to 9 cm.

Therefore, in the present application, the wheel hub motor 302 is integrally disposed in the traveling wheel by adjusting the external dimension of the wheel hub motor 302 and the arrangement position of the wheel hub motor 302. Along the axial direction of the traveling wheel, the first external dimension of the self-propelled device is controlled to be greater than or equal to 0.2 m and less than or equal to 1.5 m; and along the direction perpendicular to the axial direction of the traveling wheel, the second external dimension of the self-propelled device is controlled to be greater than or equal to 0.5 m and less than or equal to 1.5 m. The wheel hub motor 302 directly drives the traveling wheel, eliminating the need for a drive assembly such as the gearbox, making the structure of the whole machine compact, and solving the problems of the large volume and large weight of the existing smart mower, which is conducive to saving the internal space of the body, improving space utilization, reducing the dimension and weight of the whole machine, and improving the user experience.

Figure 4:
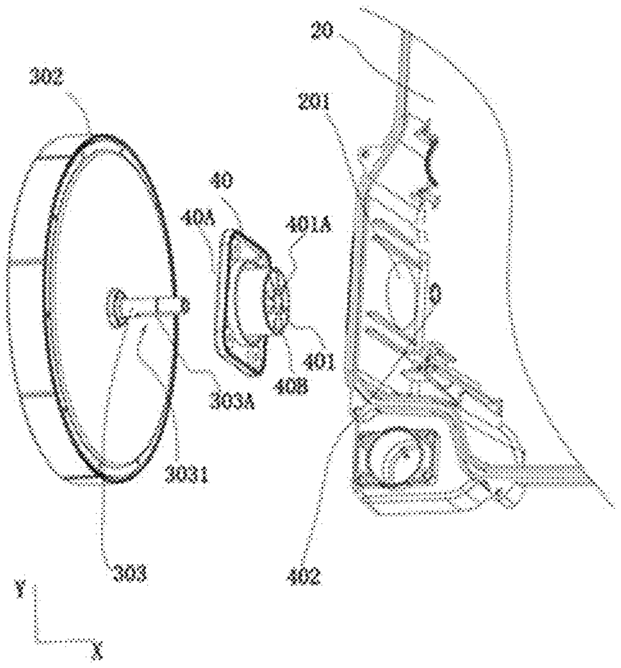
FIG. 4 is a schematic view of a mounting structure of a wheel hub motor according to the present application.

FIG. 4 is a schematic view of a mounting structure of a wheel hub motor according to the present application. Based on the example shown in FIG. 1, a specific example in which the wheel hub motor is fixed to the housing of the body 20 through a connector is illustrated.

As shown in FIG. 4, the self-propelled device 1 further includes a connector 40, the connector 40 includes a mounting hole 401, a first end surface 40A facing a side of the traveling wheel 301, and a second end surface 40B facing away from the side of the traveling wheel 301, and the inner diameter of the mounting hole 401 mates with the outer diameter of an output shaft 303 of the wheel hub motor 302. The connector 40 is used for detachably mounting the wheel hub motor 302 on the housing of the body 20.

In this example, the inner diameter of the mounting hole 401 may be configured to be greater than the outer diameter of the output shaft 303 of the wheel hub motor 302, and the inner diameter of the output shaft 303 of the wheel hub motor 302 is greater than the wire diameter of the electric motor cable*the number of wires of the electric motor cable.

For example, the outer diameter of the output shaft of the wheel hub motor 302 may be configured to be greater than 8 mm, and the inner diameter of the output shaft of the wheel hub motor 302 may be configured to be greater than 4 mm and less than 7 mm.

As shown in FIG. 4, a connector mounting hole 201 is disposed on the housing of the body 20. During the assembly process, the output shaft 303 of the wheel hub motor 302 is inserted through the mounting hole 401 of the connector 40, the second end surface of the connector 40 penetrates through the connector mounting hole 201, and the wheel hub motor 302 is detachably mounted on the housing of the body 20 through the connector 40.

In an example, a limiting mechanism is disposed between the output shaft 303 of the wheel hub motor 302 and the connector 40 and used for preventing a relative displacement from being generated between the output shaft and the connector 40, where the relative displacement includes an axial displacement and/or a circumferential displacement. That is, the limiting mechanism could be a limiting mechanism for preventing the axial displacement from being generated between the output shaft and the connector 40 and/or a limiting mechanism for preventing the circumferential displacement from being generated between the output shaft and the connector 40.

As shown in FIGS. 4 to 7, a limiting mechanism 3031 is provided between the output shaft 303 of the wheel hub motor 302 and the connector 40. In an example, the limiting mechanism 3031 may be at least one platform portion, where the platform portion extends along the axial direction X, is disposed in at least part of a region of the output shaft 303 and the connector 40, and is used for preventing the circumferential displacement from being generated between the output shaft and the connector 40. In this example, the platform portion includes at least a first platform portion 303A disposed on the output shaft 303 and a second platform portion 401A disposed in the mounting hole 401. The first platform portion 303A and the second platform portion 401A both extend along the axial direction X, and the width of the first platform portion 303A matches the width of the second platform part 401A. During the assembly process, the first platform portion 303A is aligned with the second platform portion 401A, the output shaft 303 is inserted through the mounting hole 401 of the connector 40, and the first platform portion 303A and the second platform portion 401A of the connector 40 mate with each other to prevent the circumferential displacement from being generated between the output shaft and the connector 40, which is conducive to improving the assembly reliability.

It is to be noted that one or more first platform portions 303A may be formed on the output shaft 303 by using a metal cutting process, and the axial length, width, and number of the first platform portions 303A and second platform portions 401A are not limited on the premise of ensuring that the first platform portion 303A and the second platform portion 401A match and are assembled.

Figure 5:
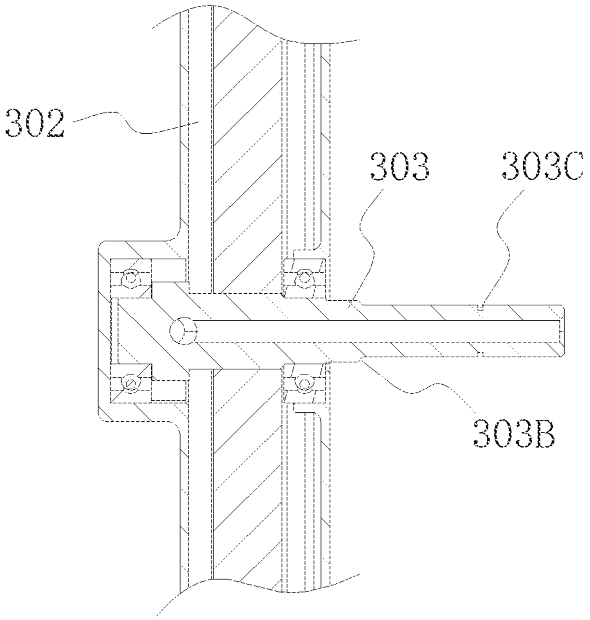
FIG. 5 is a sectional view of an output shaft of a wheel hub motor according to the present application.

Optionally, FIG. 5 is a sectional view of an output shaft of a wheel hub motor according to the present application.

As shown in FIG. 5, the limiting mechanism 3031 may include at least one step portion 303B and at least one groove portion 303C disposed on the output shaft 303 of the wheel hub motor 302. In this example, the step portion 303B may play a blocking role. When the step portion 303B is in contact with the connector 40, the output shaft 303 of the wheel hub motor 302 cannot continue penetrating the mounting hole 401 of the connector 40. In this case, the groove portion 303C and a limiting member mate with each other and are mounted, thereby preventing the axial displacement from being generated between the output shaft and the connector 40.

It is to be noted that the limiting mechanism may further include a step portion disposed on the connector 40, whose function is the same as the function of the step portion disposed on the output shaft 303. The details are not repeated here.

Figure 6:
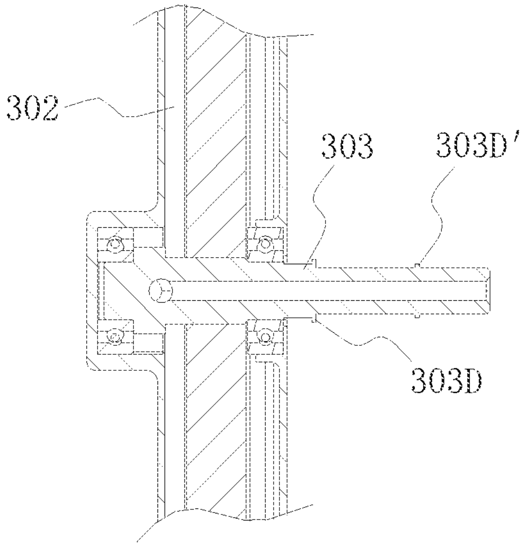
FIG. 6 is a sectional view of an output shaft of another wheel hub motor according to the present application.

Optionally, FIG. 6 is a sectional view of an output shaft of another wheel hub motor according to the present application.

As shown in FIG. 6, the limiting mechanism may further include at least one protrusion disposed on the output shaft 303 of the wheel hub motor 302. In this example, a fixing protrusion 303D may be disposed on a side of the output shaft 303 facing the wheel hub motor 302, a resettable protrusion 303D' may be disposed on a side of the output shaft 303 facing away from the wheel hub motor 302, and the distance between the fixing protrusion 303D and the resettable protrusion 303D' matches the depth of the mounting hole 401 of the connector 40. During the assembly process, when the resettable protrusion 303D' enters the mounting hole 401 of the connector 40, the resettable protrusion 303D' is compressed, the output shaft 303 continues penetrating the mounting hole 401 until the fixing protrusion 303D is in contact with the connector 40, the resettable protrusion 303D' pops out, and the fixing protrusion 303D mates with the resettable protrusion 303D' to prevent the axial displacement from being generated between the output shaft and the connector 40.

It is to be noted that the protrusion may have a square, rectangular, triangular, or semicircular structure, and those skilled in the art may adjust the shape, dimension, and number of the protrusions according to the processing difficulty, which is not limited.

Figure 7:
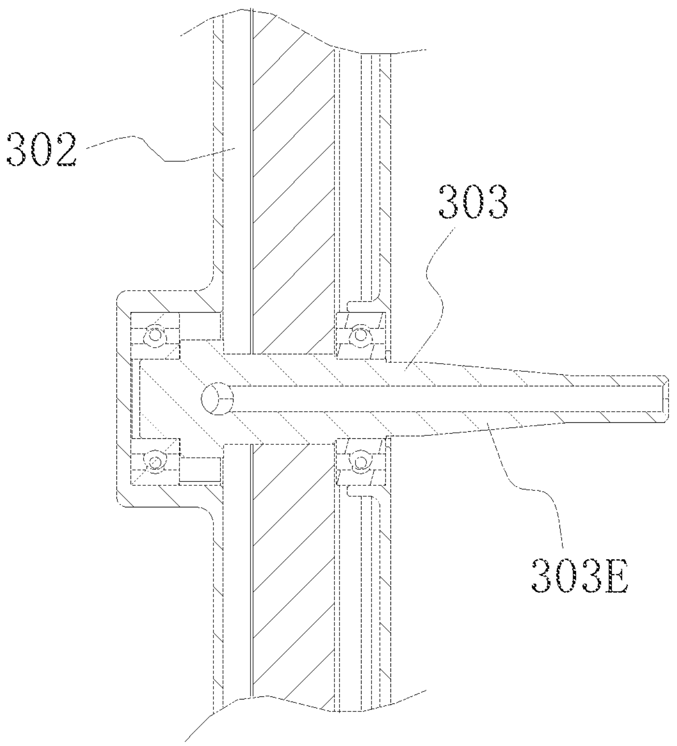
FIG. 7 is a sectional view of an output shaft of another wheel hub motor according to the present application.

Optionally, FIG. 7 is a sectional view of an output shaft of another wheel hub motor according to the present application.

As shown in FIG. 7, the limiting mechanism may include at least one radial dimension gradient portion 303E. In this example, the radial dimension gradient portion 303E may be a part of the output shaft 303 of the wheel hub motor 302 that is thin in the front and thick in the rear. Correspondingly, the mounting hole 401 of the connector 40 also has a structure that is thin in the front and thick in the rear. The minimum radial dimension of the radial dimension gradient portion 303E is less than the minimum radial dimension of the mounting hole 401, and the maximum radial dimension of the radial dimension gradient portion 303E is greater than the maximum radial dimension of the mounting hole 401. During the assembly process, the output shaft 303 gradually penetrates the mounting hole 401 until the radial dimension of the output shaft 303 is greater than the radial dimension of the mounting hole 401, and the output shaft 303 of the wheel hub motor 302 cannot continue penetrating the mounting hole 401 of the connector 40. Further, the radial dimension gradient portion 303E may mate with the groove portion 303C and the limiting member to limit the axial displacement from being generated between the output shaft 303 and the connector 40.

Figure 8:
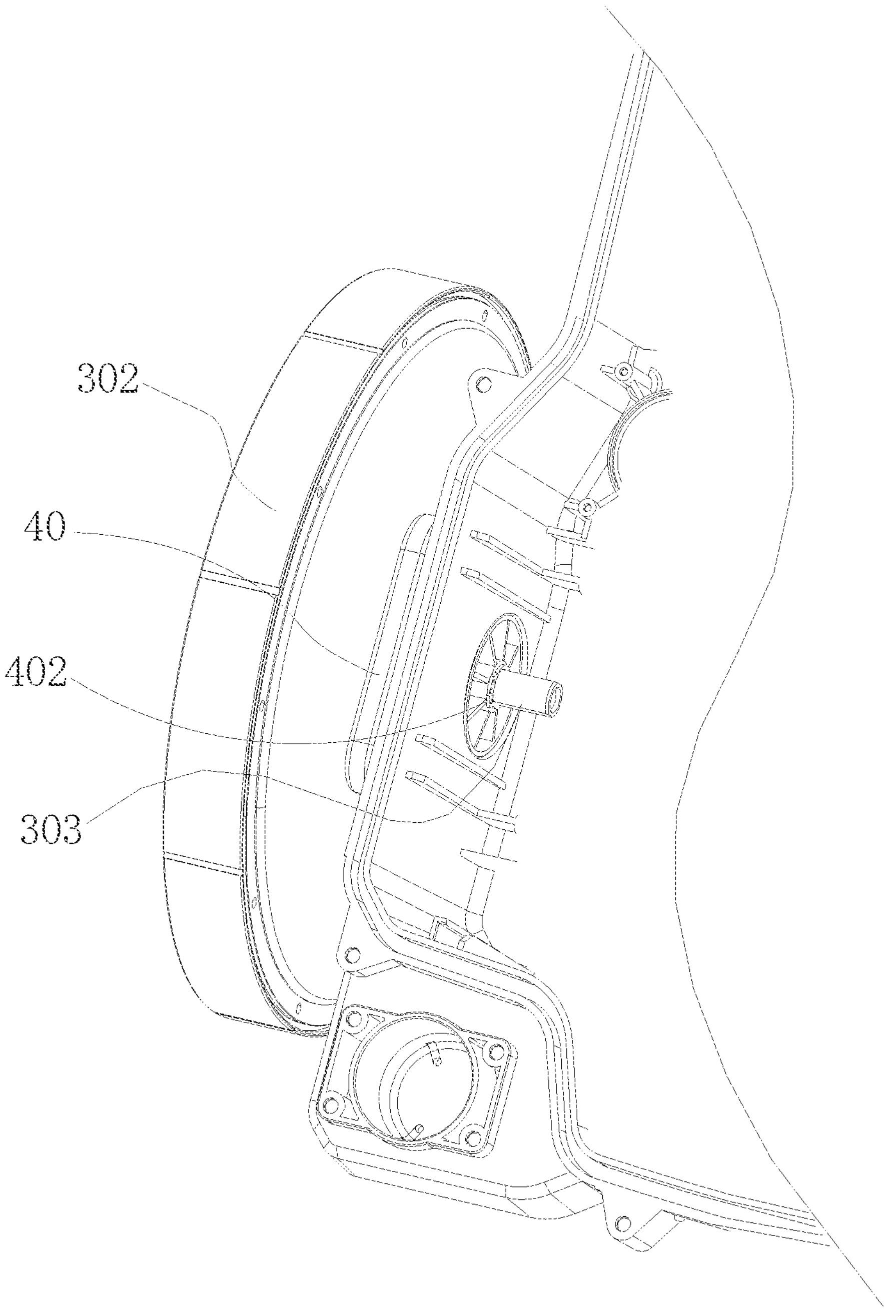
FIG. 8 is an assembly view of the wheel hub motor in FIG. 4.
Figure 9:
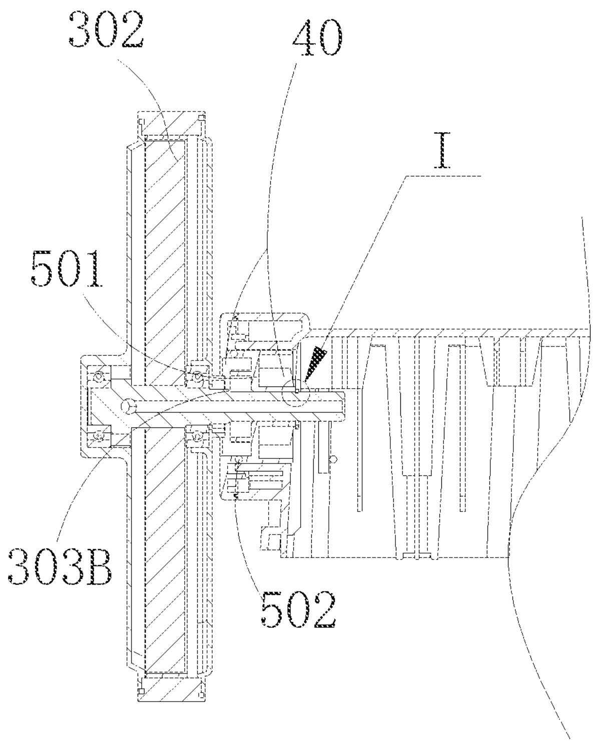
FIG. 9 is a sectional view of FIG. 8.

Optionally, FIG. 8 is an assembly view of the wheel hub motor in FIG. 4; FIG. 9 is a sectional view of FIG. 8; and FIG. 10 is a partial enlarged view of part I in FIG. 9.

As shown in FIG. 4 and FIGS. 8 to 10, the limiting mechanism further includes an end surface limiting member 402, where the end surface limiting member 402 is disposed on the second end surface of the connector 40, the end surface limiting member 402 engages with and is fixed to a first groove 303C' of the output shaft 303, and the first groove 303C' is located at the projection of the second end surface of the connector 40 on the output shaft 303.

Specifically, the end surface limiting member 402 may be a retainer ring or a hoop, and the retainer ring is provided with a fastening portion for adjusting the clamping pressure. After the first groove 303C' of the output shaft 303 protrudes from the mounting hole 401 of the connector 40, the end surface limiting member 402 engages with the first groove 303C', and the end surface limiting member 402 is fixed to the output shaft 303 through the fastening portion, so as to prevent the output shaft 303 from axially moving.

Figure 10:
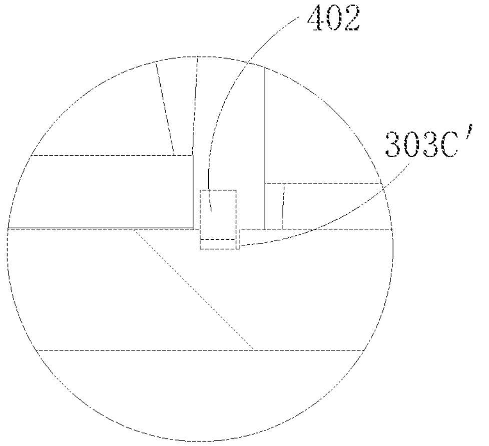
FIG. 10 is a partial enlarged view of part I in FIG. 9.

In conjunction with FIGS. 9 and 10, the self-propelled device 1 further includes a sealing mechanism, where the sealing mechanism includes at least a first sealing mechanism 501, where the first sealing mechanism 501 is disposed on a side of the output shaft facing the first end surface and used for sealing a contact surface between the connector 40 and the output shaft 303.

Specifically, the first sealing mechanism 501 may be a skeleton oil seal, and the first sealing mechanism 501 is filled in the gap between the connector 40 and the output shaft 303 and can prevent the liquid or dust from entering the inside of the body through the output shaft 303, which is conducive to improving the sealing performance of the device and improving the reliability of the device.

In conjunction with FIG. 9, the sealing mechanism further includes a second sealing mechanism 502, where the second sealing mechanism 502 is disposed between the connector 40 and the housing of the body 20 and used for sealing a contact surface between the connector 40 and the housing of the body.

Specifically, the second sealing mechanism 502 may be a rubber ring, and the second sealing mechanism 502 is disposed on the connector 40 and the housing of the body 20 and used for preventing the liquid or dust from entering the inside of the device through the connector 40, thereby improving the sealing performance of the device and improving the reliability of the device.

Figure 11:
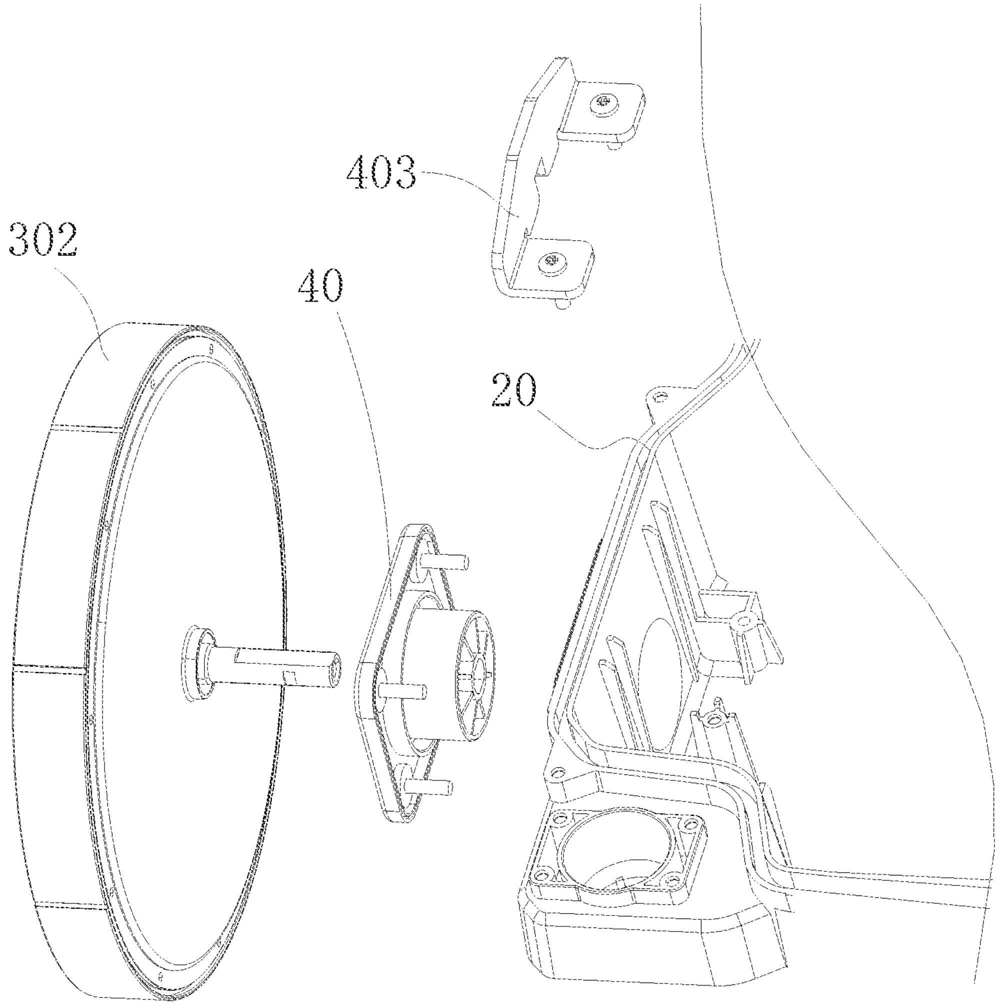
FIG. 11 is a schematic view of a mounting structure of another wheel hub motor according to the present application.
Figure 12:
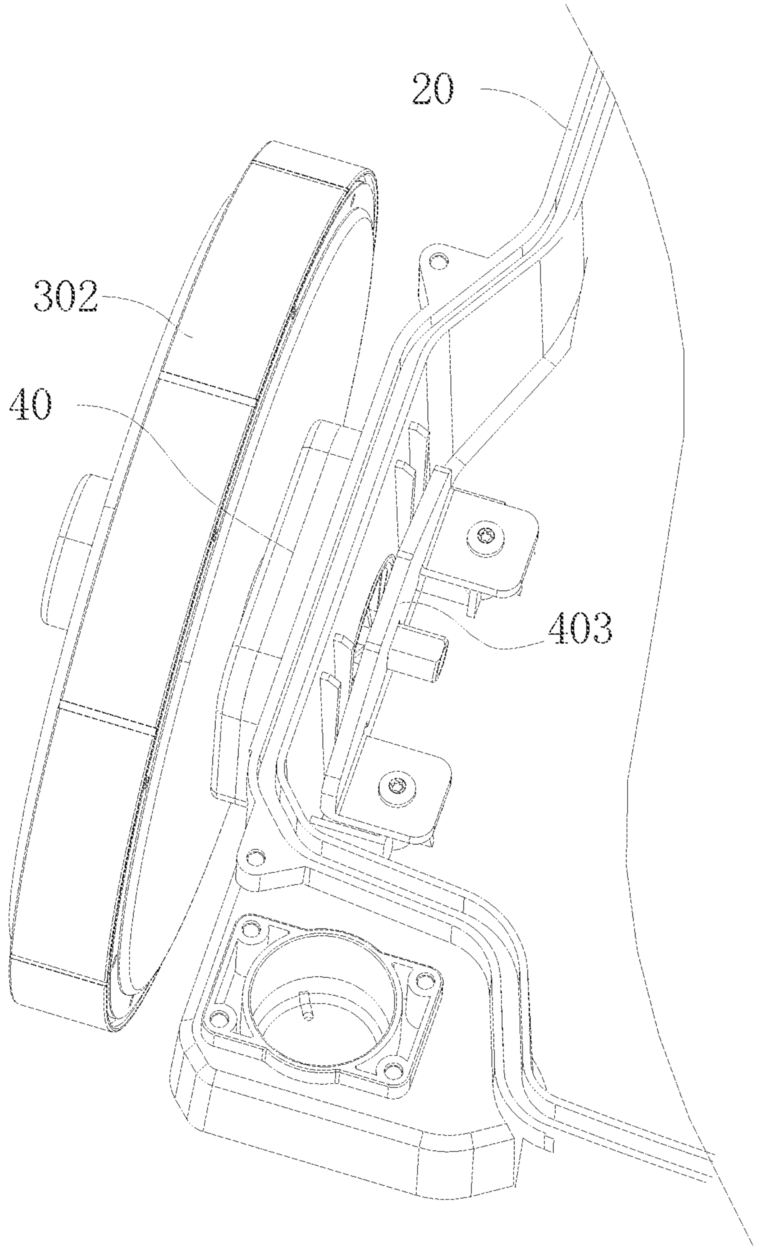
FIG. 12 is an assembly view of the wheel hub motor in FIG. 11.
Figure 13:
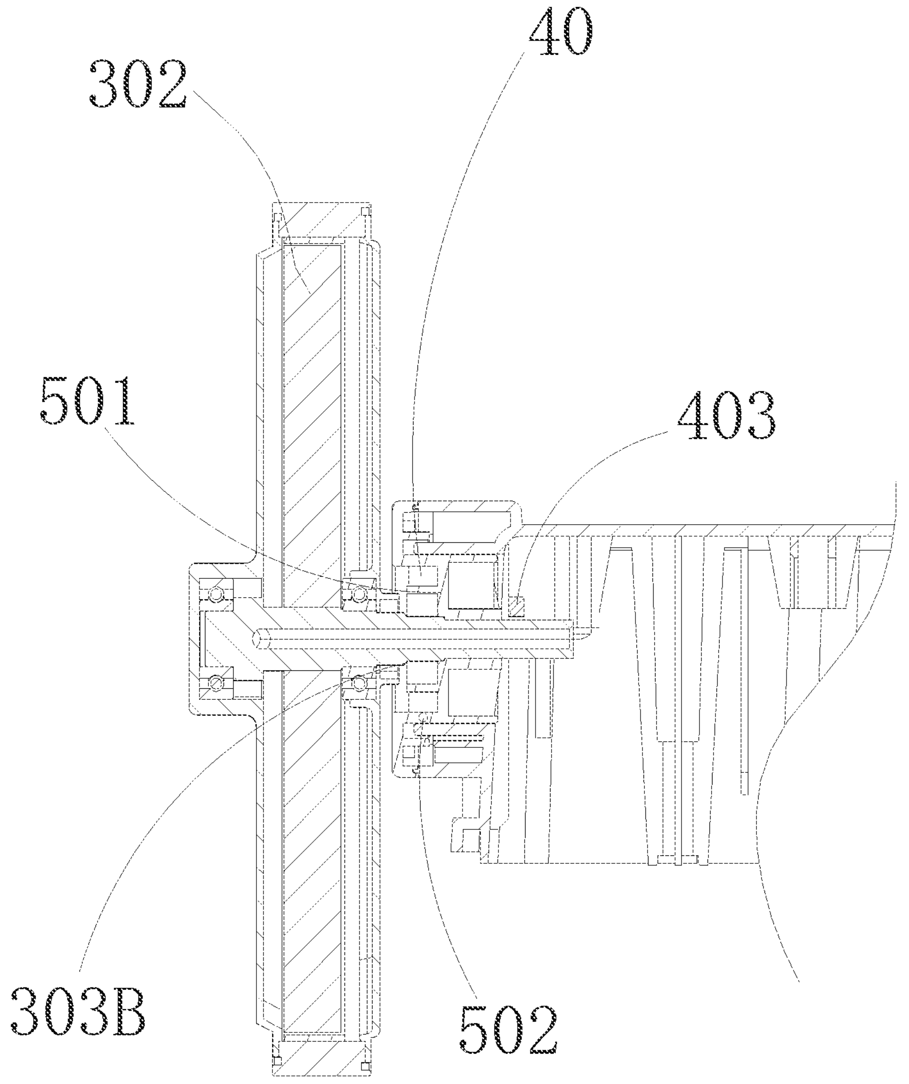
FIG. 13 is a sectional view of FIG. 12.

Optionally, FIG. 11 is a schematic view of a mounting structure of another wheel hub motor according to the present application; FIG. 12 is an assembly view of the wheel hub motor in FIG. 11; and FIG. 13 is a sectional view of FIG. 12. In this example, another specific example in which the wheel hub motor 302 is fixed to the housing of the body 20 through the connector is shown.

As shown in FIGS. 11 to 13, the limiting mechanism further includes a rigid limiting member 403, where the rigid limiting member 403 is detachably fixed to the housing of the body 20 through a mounting assembly, and the rigid limiting member 403 engages with and is fixed to the output shaft 303.

Specifically, the rigid limiting member 403 may be a steel plate, and the stopping strength of the steel plate is greater than the stopping strength of the retainer ring. The mounting assembly includes screw posts and a stiffener disposed on the body 20. After the output shaft 303 is assembled to a limit position of the mounting hole 401, the end surface limiting member 402 engages with and is fixed to the output shaft 303 through the symmetrical screw posts on two sides and the stiffener, so as to prevent the output shaft 303 from axially moving.

In this example, a platform portion (that is, a flat structure) may be disposed on the output shaft 303 of the wheel hub motor 302, and a groove matching the platform portion is disposed on the rigid limiting member 403, which is conducive to the installation of the rigid limiting member 403 while improving the structural reliability.

In this example, a second groove may also be disposed on a protruding portion of the output shaft 303 extending out of the mounting hole 401, and the end surface limiting member 402 is embedded in the second groove, thereby improving the structural reliability.

In conjunction with FIGS. 11 to 13, in this example, the self-propelled device 1 may be provided with sealing mechanisms such as the first sealing mechanism 501 and/or the second sealing mechanism 502 used for preventing the liquid or dust from entering the inside of the device through the connector 40 and the output shaft 303 of the wheel hub motor 302, which is conducive to improving the sealing performance of the device and improving the reliability of the device.

In conjunction with FIGS. 5 to 7, in this example, the limiting mechanism may be disposed between the output shaft 303 of the wheel hub motor 302 and the connector 40 and used for preventing the axial displacement and the circumferential displacement from being generated between the output shaft and the connector 40. In this example, the specific example and beneficial effects of the limiting mechanism are the same as those described in the preceding examples and are not repeated here.

Based on any of the preceding examples, the present application further provides a wheel hub motor for a self-propelled device, where the self-propelled device includes a traveling wheel, and the wheel hub motor is integrally disposed in the traveling wheel.

In conjunction with FIG. 3, the radial length of the wheel hub motor is greater than or equal to 18 cm and less than or equal to 33 cm, and the axial thickness of the wheel hub motor is less than or equal to 3.5 cm.

Optionally, the wheel hub motor 302 may be made of materials such as aluminum, plastic, or steel.

Optionally, the energy density of the wheel hub motor 302 is greater than or equal to 0.05 W/cm$^3$ and less than or equal to 0.5 W/cm$^3$. The energy density of the electric motor refers to the ratio of the maximum output power of the wheel hub motor 302 to the weight, volume, or area of the entire wheel hub motor 302 or the self-propelled device 1. The greater the energy density of the wheel hub motor 302 is, the stronger the driving capability of the wheel hub motor 302 is. The energy density of the wheel hub motor is improved, which is conducive to ensuring the driving capability of the miniaturized and lightweight self-propelled device.

Optionally, the heat dissipation area of the wheel hub motor 302 may be 50 cm$^2$ to 300 cm$^2$. The heat dissipation area of the wheel hub motor 302 refers to the surface area of the winding part of the stator windings of the wheel hub motor 302. In this example, the heat dissipation area of the electric motor may be optimized by adjusting the number of turns, wire diameter, or winding density of the stator windings, and the heat dissipation capability of the wheel hub motor 302 is improved while the wheel hub motor 302 is flattened, which is conducive to improving the working efficiency of the wheel hub motor 302, improving the performance of the wheel hub motor, and improving the driving capability of the self-propelled device.

Optionally, the slot fill factor of the wheel hub motor 302 is greater than 45%. The slot fill factor refers to the proportion of space in the slot occupied by the stator windings of the wheel hub motor 302 after being put into the electrode slot. In this example, the slot fill factor of the wheel hub motor 302 may be adjusted by reducing the thickness of the insulating material or changing the number of wires and windings. The slot fill factor of the wheel hub motor 302 is improved and the energy loss caused by windings and temperature rise of the electric motor are reduced, which is conducive to improving the working efficiency of the wheel hub motor 302, improving the performance of the wheel hub motor, and improving the driving capability of the self-propelled device. It is to be noted that, in the present application, the slot fill factor of the wheel hub motor 302 also matches the power supply voltage of the wheel hub motor 302.

Optionally, the number of magnetic pole pairs of the wheel hub motor 302 is greater than or equal to 26 pairs; or the mechanical angle between any two adjacent magnetic poles of the wheel hub motor 302 is less than or equal to 6.9°, which is conducive to improving the rotor position detection accuracy of the electric motor.

Optionally, the axial thickness of the wheel hub of the wheel hub motor 302 is positively correlated with the overall weight of the self-propelled device 1 to match the requirements of different devices and different working conditions and provide electric motor adaptability, which is conducive to simplifying the assembly process.

In an example, when the overall weight is greater than or equal to 10 kg and less than or equal to 20 kg, the axial thickness of the wheel hub is greater than or equal to 3 cm and less than or equal to 4 cm; when the overall weight is greater than 20 kg and less than or equal to 40 kg, the axial thickness of the wheel hub is greater than 4 cm and less than or equal to 6 cm; and when the overall weight is greater than 40 kg and less than or equal to 60 kg, the axial thickness of the wheel hub is greater than 6 cm and less than or equal to 9 cm.

Optionally, the rotational speed of the wheel hub motor 302 may be greater than or equal to 8 rpm, thereby achieving the low-speed driving of the self-propelled device.

Optionally, the output power of the wheel hub motor 302 is greater than or equal to 1 W. In this example, the output power of the wheel hub motor 302 may be adjusted according to actual working conditions. For example, in the working condition of traveling on the flat ground, the output power of the wheel hub motor 302 is about 2.5 W to 3 W; and in the climbing condition, the output power of the wheel hub motor 302 may be 15 W.

Therefore, in the present application, the wheel hub motor 302 is integrally disposed in the traveling wheel by adjusting the external dimension of the wheel hub motor 302 and the arrangement position of the wheel hub motor 302, and the wheel hub motor 302 directly drives the traveling wheel, eliminating the need for the drive assembly such as the gearbox, which directly adapts to the original shape and structure of the self-propelled device 1. In this manner, the change of the body housing caused by the replacement of the electric motor is avoided, and the structural versatility is strong, which is conducive to simplifying the assembly process of the electric motor and saving the production costs.

Based on the same conception of the application, the present application further provides a self-propelled device. Based on the self-propelled device in any of the preceding embodiments, a low-speed control closed-loop design of the electric motor is added to the traveling system, thereby simplifying the low-speed control strategy and improving the accuracy of the rotational speed adjustment of the electric motor.

Figure 14:
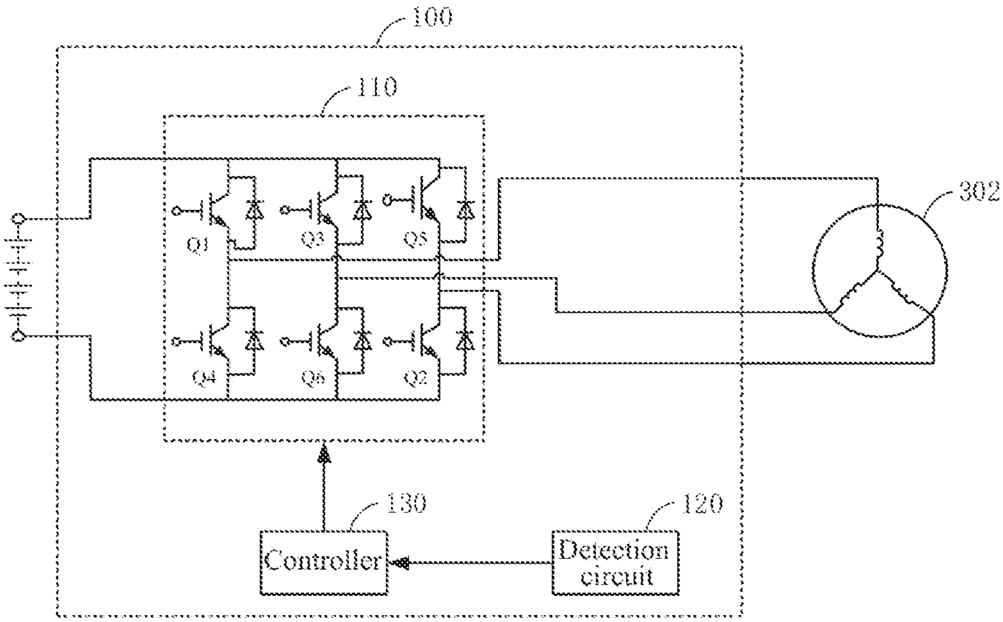
FIG. 14 is a structural diagram of a traveling system for a self-propelled device according to the present application.

FIG. 14 is a structural diagram of a traveling system for a self-propelled device according to the present application.

As shown in FIG. 14, the control circuit 100 includes a driver circuit 110, a detection circuit 120, and a controller 130. The driver circuit 110 includes multiple switching elements. Typically, the multiple switching elements include a first switching element Q1, a second switching element Q2, a third switching element Q3, a four switching element Q4, a fifth switching element Q5, and a sixth switching element Q6, where the first switching element Q1 to the sixth switching element Q6 form a full-bridge circuit used for driving the wheel hub motor 302 to operate. The detection circuit 120 is used for acquiring an operation parameter of the wheel hub motor 302. The controller 130 is connected to the driver circuit 110 and outputs a control signal according to the operation parameter to change the conduction state of the switching element and control the rotational speed of the wheel hub motor 302 to be greater than or equal to 8 rpm.

It is to be noted that the smart mower in which the wheel hub motor is integrally disposed in the traveling wheel and the rotational speed of the wheel hub motor is greater than or equal to 8 rpm is within the scope of the present application. Alternatively, the smart mower whose traveling speed is greater than or equal to 0.1 m/s after the wheel hub motor is integrally disposed in the traveling wheel is within the scope of the present application.

In this example, the detection circuit 120 includes a speed and position estimation module and a current detection module. Typically, the Hall sensor may be used as the speed and position estimation module.

In an example, the control circuit 100 is an FOC circuit. The FOC circuit refers to a circuit that performs closed-loop control on the rotational speed of the wheel hub motor 302 through a vector control strategy.

Figure 15:
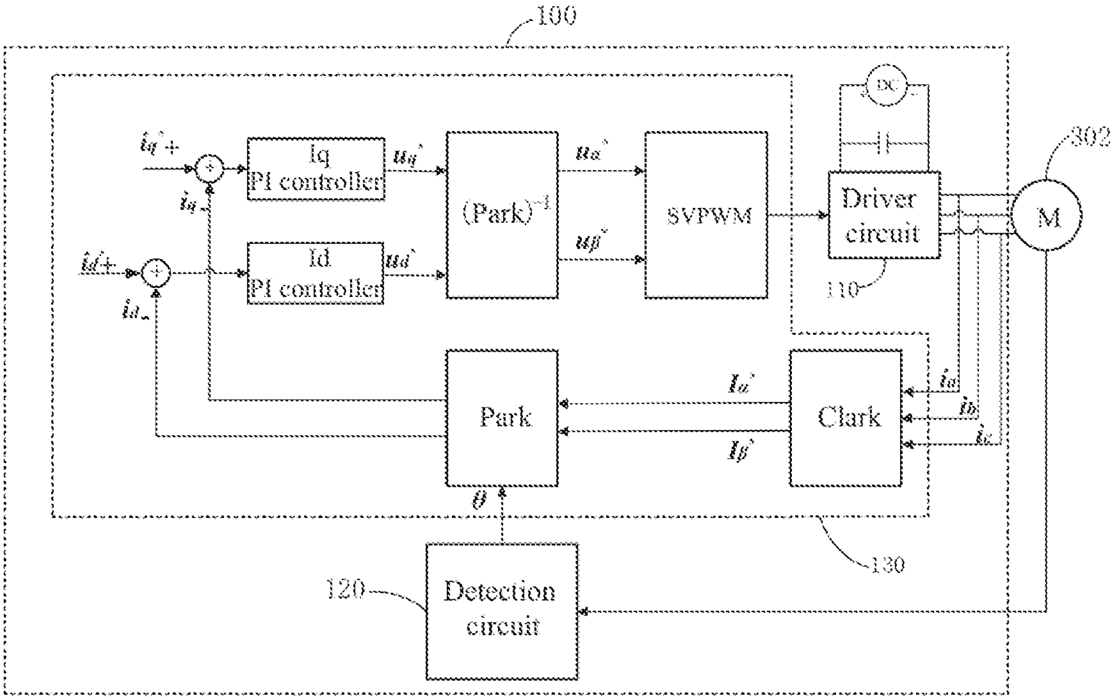
FIG. 15 is a control block diagram of an FOC circuit for a self-propelled device according to the present application.

FIG. 15 is a control block diagram of an FOC circuit for a self-propelled device according to the present application.

As shown in FIG. 15, the FOC circuit includes at least a current loop circuit and a speed loop circuit. The FOC circuit may further include a position loop circuit. The current loop circuit is used for performing a closed-loop adjustment on the electric motor current or output torque of the wheel hub motor 302, and the speed loop circuit is used for performing a closed-loop adjustment on the electric motor rotational speed of the wheel hub motor 302.

Specifically, as shown in FIG. 15, the speed loop circuit can affect the input parameter of the current loop circuit. That is to say, a proportional integral (PI) loop is added in front of the current loop circuit so as to obtain the speed loop circuit. The input parameters, that is, $i_d$* and $i_q$*, in the current loop circuit are obtained according to a preset speed parameter and an actual rotational speed parameter of the wheel hub motor 302. In the current loop circuit, the three-phase currents ($i_a$, $i_b$, and $i_c$) in the three-phase stator coordinate system are acquired based on current sampling; then, vector decomposition is performed on the control current of the wheel hub motor 302, and based on the Clark transformation, the three-phase currents ($i_a$, $i_b$, and $i_c$) in the three-phase stator coordinate system are converted into the current parameters ($i_\alpha$* and $I_\beta$*) in the two-phase stator coordinate system; then, based on the Park transformation, the current parameters ($i_\alpha$* and $I_\beta$*) in the two-phase stator coordinate system are converted into the current parameters ($i_d$ and $i_q$) in the direct-quadrature (dq) coordinate system; further, the sampling PI controller performs a closed-loop adjustment on the output deviation of the current parameters ($i_d$ and $i_q$) in the dq coordinate system and outputs the voltage parameters ($u_d$* and $u_q$*) in the dq coordinate system; further, the voltage parameters ($u_d$* and $u_q$*) in the dq coordinate system are converted into the voltage parameters ($u_\alpha$* and $u_\beta$*) in the two-phase stator coordinate system through the inverse Park transformation; and finally, the three-phase voltage parameters ($u_a$, $u_b$, and $u_c$) in the three-phase stator coordinate system are calculated based on the pulse-width modulation (PWM) wave modulation algorithm (such as the space vector pulse-width modulation (SVPWM) algorithm), so as to achieve the vector control of the wheel hub motor 302. Therefore, the current loop circuit and the speed loop circuit are provided, so as to form the double closed-loop control of speed and current.

Optionally, the operation parameter includes a current parameter fed back from the detection circuit to the current loop circuit, and the current parameter is a continuously changing smooth parameter and determined based on a rotor position parameter of the wheel hub motor.

Optionally, the detection accuracy of the rotor position parameter is less than or equal to 2.3°.

Optionally, the estimation accuracy of the rotor position parameter is greater than or equal to 0.01°. In this example, the estimation accuracy of the rotor position parameter is positively correlated with the electric motor rotational speed of the wheel hub motor 302. When the electric motor rotational speed of the wheel hub motor 302 is 40 rpm, the estimation accuracy of the rotor position is 0.012°. When the electric motor rotational speed is about 8 rpm, the estimation accuracy of the rotor position may be around 0.01°.

Optionally, the number of magnetic pole pairs of the wheel hub motor 302 is greater than or equal to 26 pairs. In this example, the estimation accuracy of the rotor position parameter is negatively correlated with the number of magnetic pole pairs. When the number of magnetic pole pairs of the wheel hub motor 302 is equal to 26 pairs, the detection accuracy of the rotor position parameter is 2.3°. As the number of pole pairs increases, the detection accuracy of the rotor position parameter becomes less than 2.3°.

Optionally, the mechanical angle between any two adjacent magnetic poles of the wheel hub motor is less than or equal to 6.9°.

Specifically, the Hall element may be used to detect the rotor position, and the detection angle of the Hall element is greater than or equal to 6.9°. When the number of magnetic pole pairs of the wheel hub motor 302 is equal to 26 pairs, the mechanical angle between the magnetic poles is equal to 6.9°. The angular velocity of the rotor is calculated within a detection angle range (that is, 6.9°), and the rotor position may be calculated according to the angular velocity at any moment of the next 6.9°. At the turning point, the estimated rotor position is updated according to the rotor position detected by the Hall sensor so that the rotor position provided by the Hall element changes continuously, and the current parameter obtained based on the rotor position also changes continuously.

Therefore, in the technical solution of the embodiment of the present application, the traveling wheel, the wheel hub motor, and the control circuit are provided, the wheel hub motor is integrally disposed in the traveling wheel, the control circuit is provided with the driver circuit, the detection circuit, and the controller, the detection circuit acquires the operation parameter of the wheel hub motor, and the controller outputs the control signal according to the operation parameter to change the conduction state of the switching element and control the rotational speed of the wheel hub motor to be greater than or equal to 8 rpm. The electric motor is integrally disposed in the hub and the low-rotational-speed control closed-loop design is designed for the wheel hub motor, solving the problems of the large volume, large weight, and complex low-speed control strategy of the existing smart mower, which is conducive to reducing the dimension and weight of the whole machine, simplifying the low-speed control strategy, reducing the hardware costs, and improving the accuracy of the rotational speed adjustment.

Based on the same conception of the application, the present application further provides another self-propelled device. Based on the self-propelled device in any of the preceding embodiments, a low-speed control closed-loop design of the traveling wheel is added to the traveling system, thereby simplifying the low-speed control strategy and improving the speed adjustment accuracy of the device.

In this example, the control circuit includes a driver circuit including multiple switching elements and used for driving a wheel hub motor to operate; a detection circuit used for acquiring an operation parameter of the wheel hub motor; and a controller connected to the driver circuit and outputting a control signal according to the operation parameter to change the conduction state of the switching element and control the traveling speed of the traveling wheel to be greater than or equal to 0.1 m/s. The diameter of the wheel hub motor is greater than or equal to 18 cm and less than or equal to 33 cm.

In an example, the control circuit is the FOC circuit. The FOC circuit includes at least a current loop circuit and a speed loop circuit, where the current loop circuit is used for performing a closed-loop adjustment on the electric motor current or output torque of the wheel hub motor, and the speed loop circuit is used for performing a closed-loop adjustment on the electric motor rotational speed of the wheel hub motor.

Optionally, the operation parameter includes a current parameter fed back from the detection circuit to the current loop circuit, and the current parameter is a continuously changing smooth parameter and determined based on a rotor position parameter of the wheel hub motor.

Optionally, the detection accuracy of the rotor position parameter is less than or equal to 2.3°.

Optionally, the estimation accuracy of the rotor position parameter is greater than or equal to 0.01°.

Optionally, the number of magnetic pole pairs of the wheel hub motor is greater than or equal to 26 pairs.

Optionally, the mechanical angle between any two adjacent magnetic poles of the wheel hub motor is less than or equal to 6.9°.

Therefore, in the technical solution of the embodiment of the present application, the traveling wheel, the wheel hub motor, and the control circuit are provided, the wheel hub motor is integrally disposed in the traveling wheel, the control circuit is provided with the driver circuit, the detection circuit, and the controller, the detection circuit acquires the operation parameter of the wheel hub motor, and the controller outputs the control signal according to the operation parameter to change the conduction state of the switching element and control the traveling speed of the traveling wheel to be greater than or equal to 0.1 m/s. The electric motor is integrally disposed in the hub and the low-rotational-speed control closed-loop design is designed for the traveling wheel, solving the problems of the large volume, large weight, and complex low-speed control strategy of the existing smart mower, which is conducive to reducing the dimension and weight of the whole machine, simplifying the low-speed control strategy, reducing the hardware costs, and improving the accuracy of the rotational speed adjustment.

An example provides a push working machine, where the push working machine includes a handle, a wheel assembly, and at least one drive motor. The handle forms a grip for the user to hold, and the user may operate the push working machine by holding the handle. The wheel assembly includes at least one wheel, and the number of wheels may be set to 1, 2, 3, 4, or more according to requirements. At least part of the drive motor is disposed in the wheel to at least drive the wheel to move. Specifically, a motor shaft of the drive motor coincides with a rotation axis of the corresponding wheel, and the motor shaft of the drive motor is directly connected to the wheel, so as to directly drive the corresponding wheel to rotate. More specifically, the number of drive motors and the number of wheels may be the same so that one drive motor drives only one wheel to rotate. The number of drive motors may be different from the number of wheels so that one drive motor drives two wheels with basically coincident rotation axes. In some specific examples, the drive motor is a brushless motor. In some more specific examples, the drive motor is an outer rotor wheel hub motor.

In this example, the total rated power P1 of the drive motor is less than or equal to 1000 W. Optionally, the total rated power P1 of the drive motor is greater than or equal to 100 W and less than or equal to 1000 W. It is to be noted here that the total rated power of the drive motor is the sum of the power of all the drive motors used for driving the wheel assembly. If different drive motors (for example, the drive motors include the wheel hub motor and an electric motor of another type) separately drive different wheels of the wheel assembly, the total rated power of the drive motor is the sum of the power of the wheel hub motor and the power of the electric motor of another type. Specifically, it is to be noted that the total rated power of the drive motor is not the output power of the push working machine. For example, when the push working machine is specifically a walk-behind four-wheel drive working machine, the total rated power P1 of the drive motor is as high as 1000 W. The rated voltage U1 of the drive motor is greater than or equal to 12 V and less than or equal to 120 V. Optionally, the rated voltage U1 of the drive motor is greater than or equal to 20 V and less than or equal to 120 V. The rated voltage U2 of the push working machine is greater than or equal to 18 V. Optionally, the rated voltage U2 of the push working machine is greater than or equal to 36 V. Further optionally, the rated voltage U2 of the push working machine is greater than or equal to 40 V and less than or equal to 120 V. The efficiency η1 of the drive motor is greater than 70%. In a specific example, the efficiency η1 of the drive motor is 75%. In another specific example, the efficiency η1 of the drive motor is 80%. In another specific example, the efficiency η1 of the drive motor is 85%.

In the push working machine, at least part of the drive motor is disposed in the wheel so that the drive motor is directly connected to the wheel, eliminating the need for a transmission mechanism and ensuring the advantages of a simple structure, easy control, small space occupation, and low requirements for the assembly process.

It is to be noted that the cooling method of the push working machine may be natural cooling or may be cooling by injecting oil between the wheel hub motor and the wheel.

The push working machine may specifically be a snow thrower and a mower. The snow thrower and the mower are used as examples for the further detailed description below.

FIG. 16 to FIG. 24 show examples of other power tools, machines or devices that could utilize the same type of wheel hub motor describe above. The similar characteristics will not be repeated again below.

Figure 16:
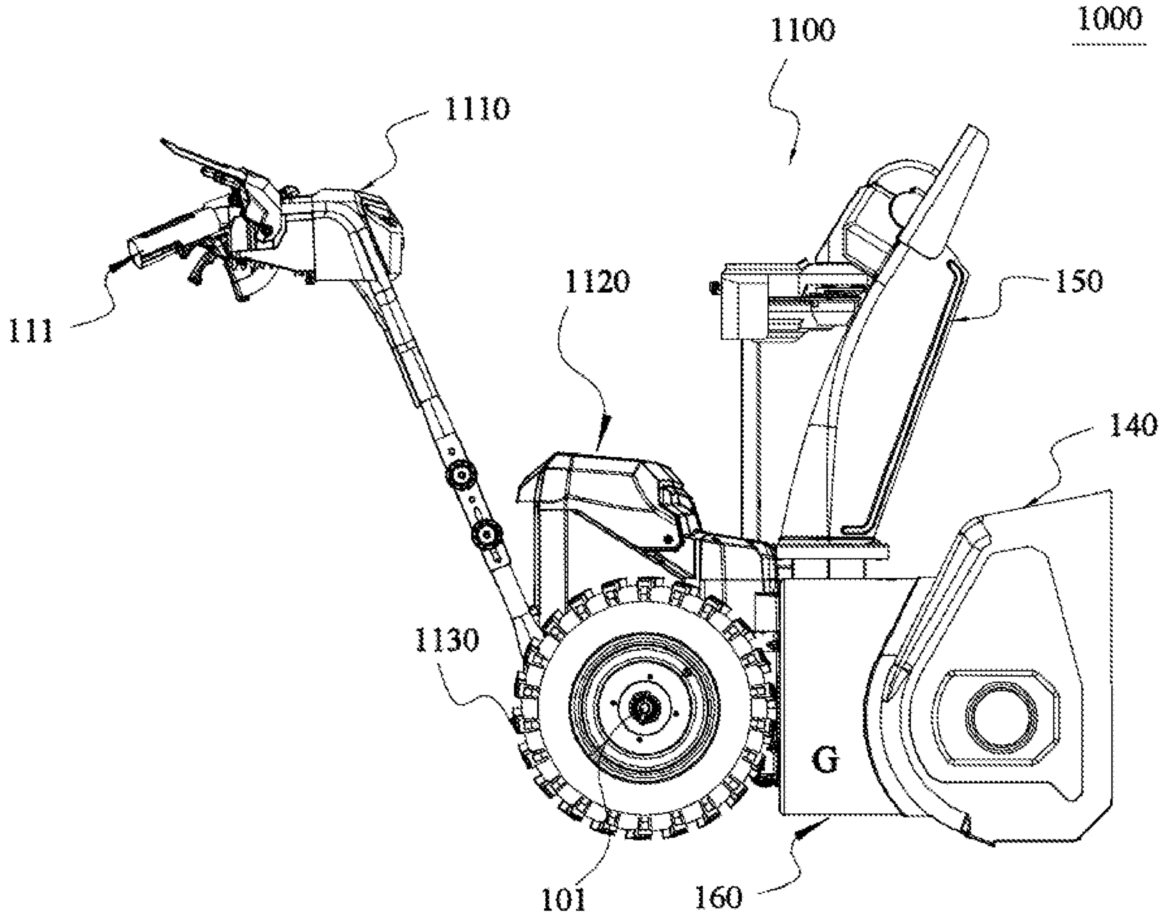
FIG. 16 is a structural view of a snow thrower according to example one of the present application.

FIG. 16 is a schematic view of a snow thrower 1000 as a specific example. The snow thrower 1000 includes a body 1100 and an operating assembly 1110 connected to the body 1100. The operating assembly 1110 includes an upper connecting rod, and the body 1100 includes a lower connecting rod. The upper connecting rod and the lower connecting rod are connected by fasteners such as screws and nuts to achieve the connection between the body 1100 and the operating assembly 1110. The upper connecting rod and the lower connecting rod form a telescopic connection to adjust the height of the operating assembly 1110 relative to the ground.

The operating assembly 1110 further includes a handle 111 for the user to operate, and the handle 111 forms a grip. The user may push the handle 111 to move the body 1100 relative to the ground so that the snow thrower 1000 moves relative to the ground.

The body 1100 includes a body housing 160, an energy system, a wheel assembly 1130, a snow removal system 140, and a snow throwing system 150. The energy system includes a battery pack 1120, and the battery pack 1120 may be a single battery pack or multiple battery packs. The energy system in this example includes two battery packs which are direct current lithium batteries.

Figure 17:
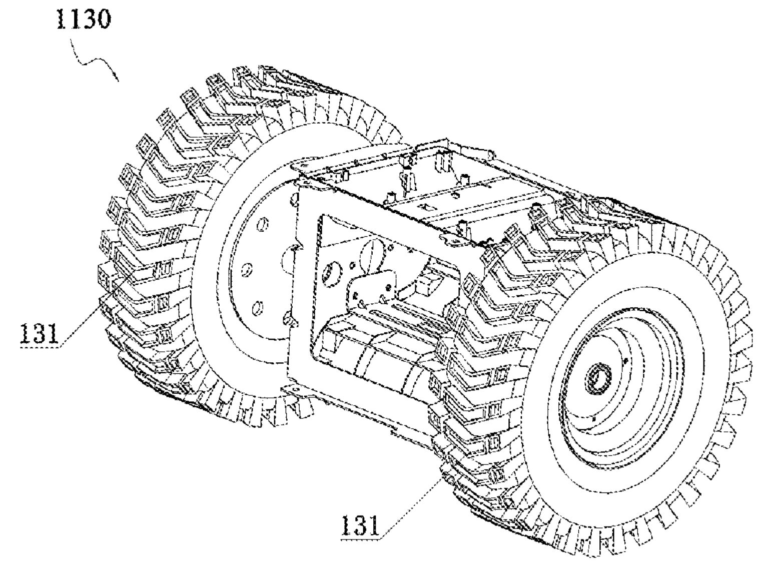
FIG. 17 is a structural view of a wheel assembly of a snow thrower according to example one of the present application.
Figure 18:
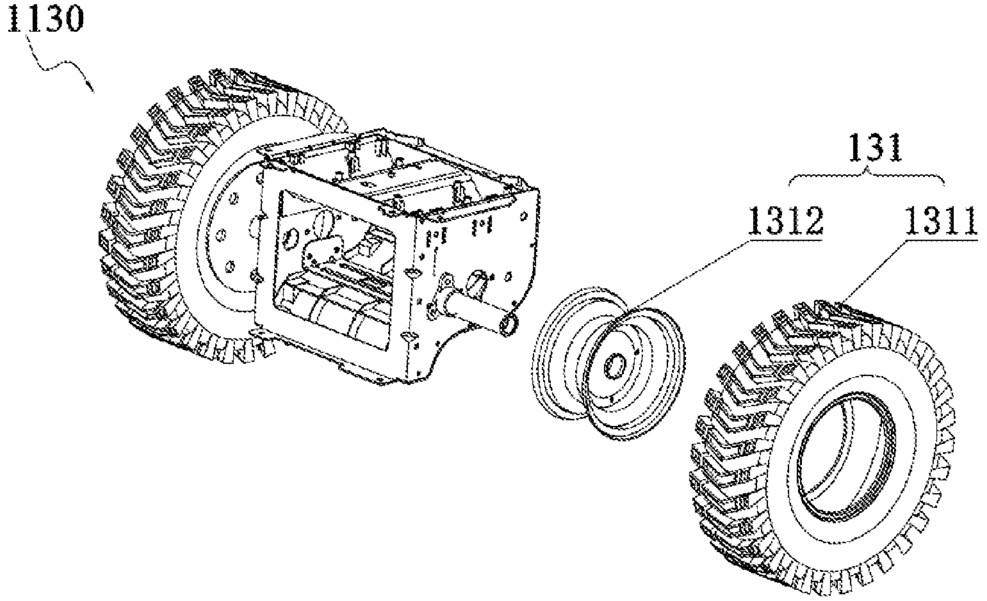
FIG. 18 is an exploded view of a wheel assembly of a snow thrower according to example one of the present application.

As shown in FIGS. 16 to 18, the wheel assembly 1130 includes two first rear wheels 131 capable of traveling on the ground, and the first rear wheels 131 rotate around a rotation axis 101 relative to the body 1100 so that the snow thrower 1000 moves relative to the ground. Specifically, the two first rear wheels 131 are symmetrically arranged on two sides of the body 1100 and are connected through a traveling axle. In this example, the first rear wheel 131 includes a tire 1311 and a wheel hub motor 1312 disposed in the tire 1311. The wheel hub motor 1312 is used for driving the tire 1311 to rotate around the rotation axis 101 relative to the body 1100 so that the snow thrower 1000 moves relative to the ground.

The snow removal system 140 includes an auger and a snow thrower paddle. The auger is a functional element of the snow thrower 1000 and used for stirring the snow on the ground. The body housing 160 includes an auger housing and a snow thrower paddle housing. The auger housing forms a first accommodation space for accommodating at least part of the auger, and the auger can rotate around a first straight line in the first accommodation space. The snow thrower paddle housing forms a second accommodation space for accommodating at least part of the snow thrower paddle, and the snow thrower paddle can rotate around a second straight line in the snow thrower paddle housing. The first straight line is perpendicular to the second straight line. The first accommodation space connects with the second accommodation space. A snow inlet is defined in the first accommodation space, and a snow outlet is defined in the second accommodation space. Under the action of the auger, snow enters the auger housing from the snow inlet of the auger housing and is discharged from the snow outlet by the snow thrower paddle. The body housing 160 further includes a snow outlet tube protruding from the second accommodation space, and the snow outlet tube basically extends along a tangential direction of a cylinder and is connected to the snow outlet. The snow removal system 140 further includes a power motor used for driving the auger to rotate around the first straight line and driving the snow thrower paddle to rotate around the second straight line.

The snow throwing system 150 of the snow thrower includes a deflector and a snow thrower part. The snow thrower part surrounds a semi-closed channel and an opening is defined. A first end of the snow thrower part is rotatably connected to the snow thrower paddle housing to connect with the second accommodation space and the outside. That is to say, the snow thrower part is connected to the snow thrower paddle housing and the deflector so as to form a channel for continuous snow removal. The deflector is mounted to a second end of the snow thrower part. In this example, the deflector is mounted to the top of the snow thrower part. The snow is thrown into the air after passing through the snow thrower paddle housing, the snow outlet tube, the snow thrower part, and the deflector. The snow throwing system 150 further includes a first drive device and a second drive device. The first drive device is connected to the upper or middle part of the snow thrower part and used for driving the snow thrower part to rotate around a first axis relative to the body 1100. The second drive device is connected to the deflector and used for driving the deflector to rotate around a second axis relative to the snow thrower part. The first axis is perpendicular to the second axis. Optionally, each of the first drive device and the second drive device could be a combination of an electric motor and gears.

In some specific examples, the total rated power P1 of the wheel hub motor 1312 is greater than or equal to 300 W and less than or equal to 1000 W, such as 500 W, 520 W, 530 W, 550 W, 580 W, 590 W, 600 W, or 1000 W.

In some specific examples, the diameter D1 of the first rear wheel 131 is greater than or equal to 4 inches and less than or equal to 22 inches, such as 4 inches, 8 inches, 11 inches, 15 inches, 16 inches, or 22 inches. The tire width W1 of the first rear wheel 131 is greater than or equal to 3 inches, such as 5 inches or 6 inches. The hub diameter D2 of the first rear wheel 131 is less than or equal to the diameter D1 of the first rear wheel 131. For example, when the diameter D1 of the first rear wheel 131 is 15 inches or 16 inches, the hub diameter D2 may be 7 inches. The hub thickness T1 of the first rear wheel 131 is greater than or equal to 3 inches, such as 4 inches.

In some specific examples, the traveling speed of the first rear wheel 131 is less than or equal to 2 m/s. In some more specific examples, the forward speed V1 of the first rear wheel 131 is greater than or equal to 0.3 m/s and less than or equal to 1.1 m/s, such as 0.3 m/s, 0.6 m/s, 0.7 m/s, 0.9 m/s, or 1.1 m/s. The backward speed V2 of the first rear wheel 131 is greater than or equal to 0.3 m/s and less than or equal to 0.6 m/s, such as 0.3 m/s, 0.45 m/s, or 0.6 m/s.

In some specific examples, the overall weight of the push working machine is less than or equal to 150 kg. Optionally, the overall weight of the push working machine is greater than or equal to 60 kg and less than or equal to 90 kg, such as 60 kg, 75 kg, 82 kg, or 90 kg.

In some specific examples, the rotational speed of the drive motor is greater than or equal to 10 rpm and less than or equal to 380 rpm. Optionally, the rotational speed of the drive motor is greater than or equal to 15 rpm and less than or equal to 55 rpm, such as 15 rpm, 30 rpm, or 55 rpm.

In some specific examples, the stack length of the wheel hub motor 1312 is greater than or equal to 30 mm and less than or equal to 200 mm. Optionally, the stack length of the wheel hub motor 1312 is greater than or equal to 40 mm and less than or equal to 100 mm. The outer diameter of the wheel hub motor 1312 is greater than or equal to 100 mm and less than or equal to 550 mm. Optionally, the outer diameter of the wheel hub motor 1312 is greater than or equal to 160 mm and less than or equal to 175 mm. The rotational speed of the wheel hub motor 1312 is less than or equal to 100 rpm. Optionally, the rotational speed of the wheel hub motor 1312 is greater than or equal to 22 rpm and less than or equal to 80 rpm. The torque of the wheel hub motor 1312 is less than or equal to 80 N·m. Optionally, the torque of the wheel hub motor 1312 is greater than or equal to 20 N·m and less than or equal to 60 N·m. The slot fill factor of the wheel hub motor 1312 in a varnished state is greater than 45%. The number of slots and poles of the wheel hub motor 1312 may be 27 slots and 30 poles, 48 slots and 52 poles, 51 slots and 46 poles, or 63 slots and 56 poles. It is to be noted that when the drive motor is the wheel hub motor 1312, to make the vibration of the wheel hub motor 1312 relatively small, the wheel hub motor 1312 with a large number of slots and a large number of poles may be selected.

In some specific examples, the maximum slope of the traveling surface on which the snow thrower can travel is greater than or equal to 20° and less than or equal to 25°, such as 20°, 21°, 22°, 23°, 24°, or 25°.

In some specific examples, the torque required for the snow thrower to travel on a flat road is 2 N·m. The torque required for the snow thrower to travel on the slope is 45 N·m.

Figure 19:
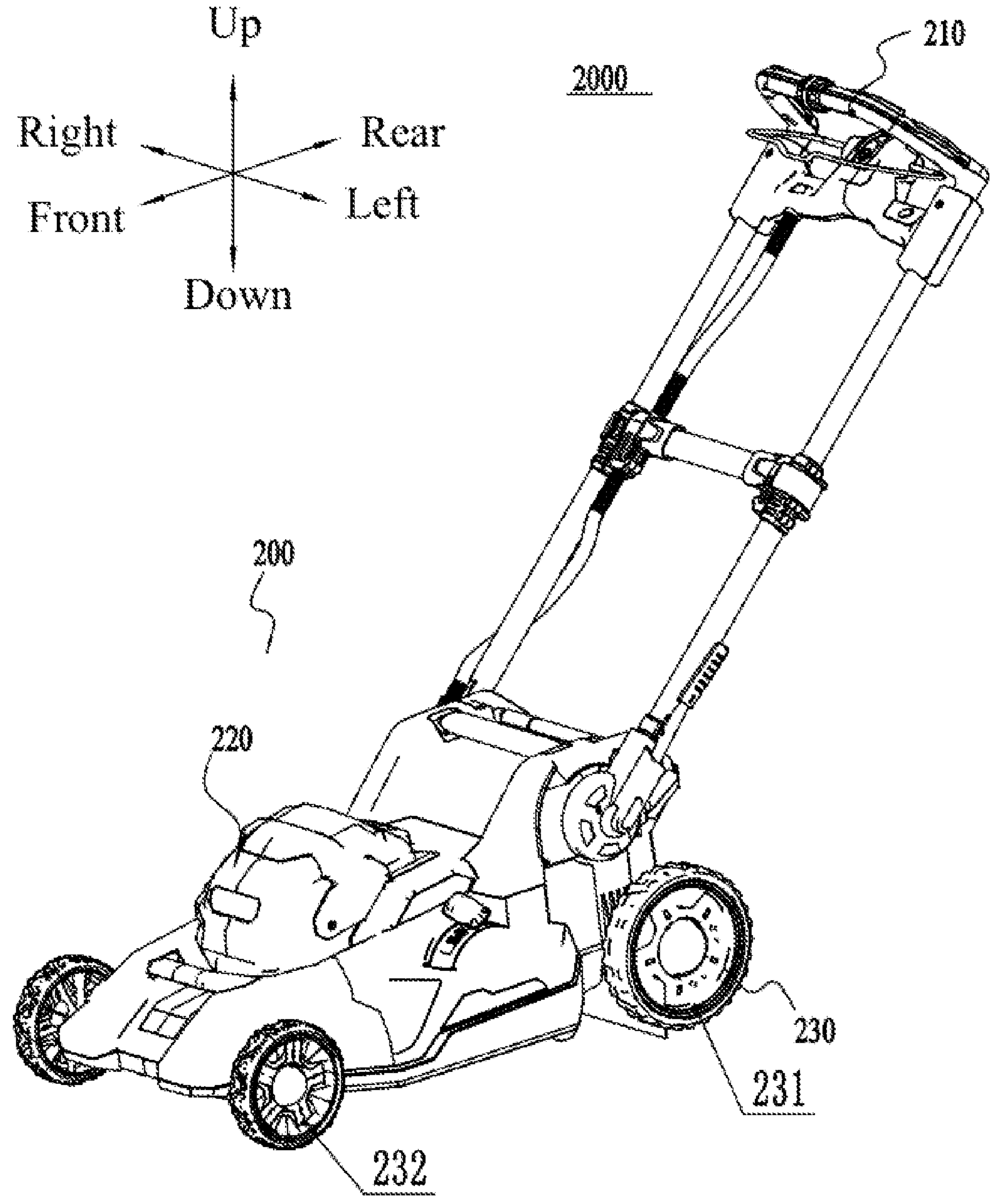
FIG. 19 is a structural view of a mower according to example one of the present application.
Figure 20:
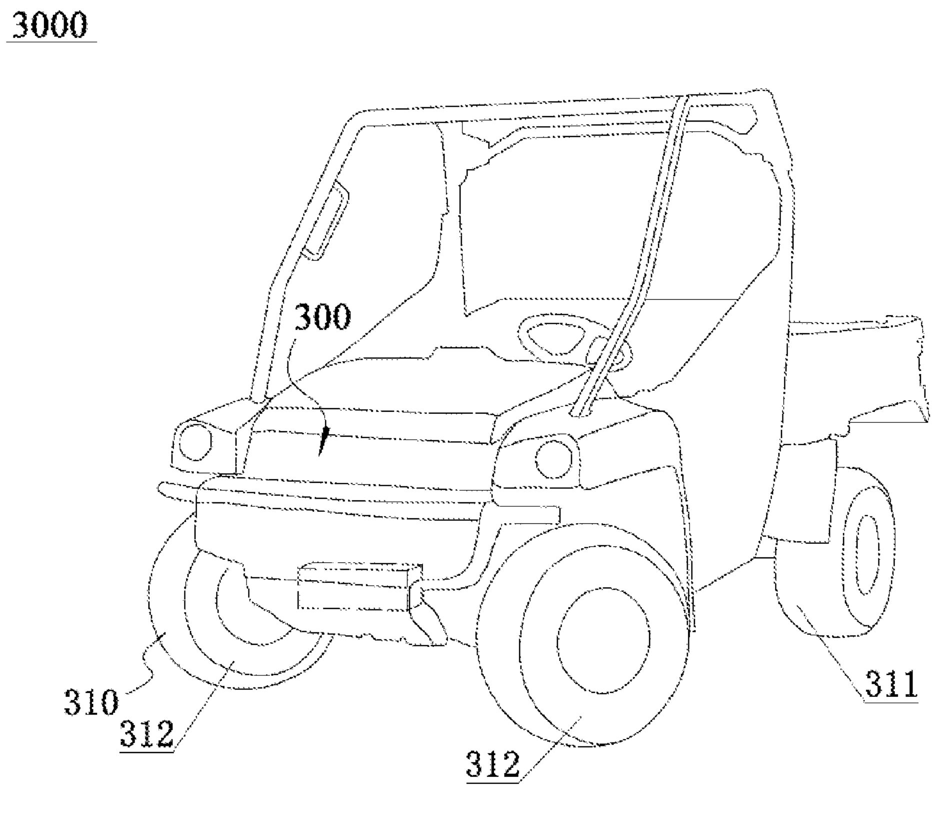
FIG. 20 is a structural view of an all-terrain vehicle according to example two of the present application.

FIG. 19 is a schematic view of a mower 2000 as a specific example. The mower 2000 includes a body 200 and an operating assembly connected to the body 200. The operating assembly includes an upper connecting rod, and the body 200 includes a lower connecting rod. The upper connecting rod and the lower connecting rod are connected by fasteners such as screws and nuts to achieve the connection between the body 200 and the operating assembly. The upper connecting rod and the lower connecting rod form a telescopic connection to adjust the height of the operating assembly relative to the ground.

The operating assembly further includes a handle 210 for the user to operate, and the handle 210 forms a grip. The user may push the handle 210 to move the body 200 relative to the ground so that the mower 2000 moves relative to the ground.

The body 200 includes a body housing 160, an energy system, a wheel assembly 230, and a mowing assembly. The energy system includes a battery pack 220, and the battery pack 220 may be a single battery pack or multiple battery packs. The energy system in this example includes two battery packs which are direct current lithium batteries. The mowing assembly includes a mowing blade capable of rotating around a vertical axis and a drive motor, where the drive motor is used for driving the mowing blade to rotate, and the battery pack 220 is used for supplying power to the drive motor.

As shown in FIG. 19, the wheel assembly 230 includes two second rear wheels 231 and two first front wheels 232 capable of traveling on the ground, where the two second rear wheels 231 are symmetrically arranged on two sides of the rear end of the body 200 and connected through a rear connecting axle, and the two first front wheels 232 are symmetrically arranged on two sides of the front end of the body 200 and connected through a front connecting axle. The second rear wheels 231 and the first front wheels 232 are rotatable so that the mower 2000 moves relative to the ground. In this example, the second rear wheel 231 includes a tire and a wheel hub motor disposed in the tire. The wheel hub motor is used for driving the tire to rotate around the rotation axis relative to the body so that the mower 2000 moves relative to the ground.

In some specific examples, the total rated power P1 of the wheel hub motor is greater than or equal to 100 W and less than or equal to 1000 W, such as 300 W, 400 W, 500 W, 600 W, or 1000 W.

In some specific examples, the diameter D3 of the second rear wheel 231 is greater than or equal to 4 inches and less than or equal to 16 inches, such as 9 inches. The tire width W2 of the second rear wheel 231 is greater than or equal to 1.5 inches, such as 2 inches. The hub diameter D4 of the second rear wheel 231 is greater than or equal to 6 inches, such as 8 inches. The hub thickness T2 of the second rear wheel 231 is greater than or equal to 1.3 inches, such as 1.7 inches. The traveling speed V3 of the second rear wheel 231 is less than or equal to 2 m/s. Optionally, the traveling speed V3 of the second rear wheel 231 is greater than or equal to 0.4 m/s and less than or equal to 1.4 m/s, such as 0.4 m/s, 0.7 m/s, 0.9 m/s, 1.3 m/s, or 1.4 m/s.

In some specific examples, the rotational speed of the drive motor is greater than or equal to 15 rpm and less than or equal to 380 rpm. Optionally, the rotational speed of the drive motor is greater than or equal to 33 rpm and less than or equal to 120 rpm, such as 33 rpm, 44 rpm, 55 rpm, 66 rpm, 77 rpm, 88 rpm, 99 rpm, 110 rpm, or 120 rpm.

In some specific examples, the stack length of the wheel hub motor is greater than or equal to 20 mm and less than or equal to 100 mm. Optionally, the stack length of the wheel hub motor is greater than or equal to 30 mm and less than or equal to 60 mm. The outer diameter of the wheel hub motor is greater than or equal to 100 mm and less than or equal to 410 mm. Optionally, the outer diameter of the wheel hub motor is greater than or equal to 180 mm and less than or equal to 200 mm. The rotational speed of the wheel hub motor is less than or equal to 160 rpm. Optionally, the rotational speed of the wheel hub motor is greater than or equal to 30 rpm and less than or equal to 120 rpm. The torque of the wheel hub motor is less than or equal to 35 Nm. Optionally, the torque of the wheel hub motor is greater than or equal to 10 Nm and less than or equal to 25 N·m. The slot fill factor of the wheel hub motor in a varnished state is greater than 45%. The number of slots and poles of the wheel hub motor may be 27 slots and 30 poles, 48 slots and 52 poles, 51 slots and 46 poles, or 63 slots and 56 poles. It is to be noted that when the drive motor is the wheel hub motor, to make the vibration of the wheel hub motor relatively small, the wheel hub motor with a large number of slots and a large number of poles may be selected.

In some specific examples, the maximum slope of the traveling surface on which the mower 2000 can travel is greater than or equal to 20° and less than or equal to 25°, such as 20°, 21°, 22°, 23°, 24°, or 25°.

In some specific examples, the torque required for the mower 2000 to travel on a flat road is 0.5 N·m. The torque required for the snow thrower to travel on the slope is 12 N·m.

An example provides an all-terrain vehicle 3000, where the all-terrain vehicle 3000 includes a body 300, a wheel assembly 310, an operating assembly, and at least one drive motor. The wheel assembly 310 includes at least one wheel, and the number of wheels may be set to 1, 2, 3, 4, or more according to requirements. The operating assembly is used for the user to operate the all-terrain vehicle 3000. Specifically, the operating assembly includes mechanisms such as a steering wheel and a brake. The steering wheel is formed with a grip for the user to hold. The user may operate the all-terrain vehicle 3000 by holding the steering wheel. The body 300 includes a body housing, on which the wheel assembly 310 and the operating assembly are both disposed.

At least part of the drive motor is disposed in the wheel and at least drives the wheel to move. Specifically, a motor shaft of the drive motor coincides with a rotation axis of the corresponding wheel, and the motor shaft of the drive motor is directly connected to the wheel, so as to directly drive the corresponding wheel to rotate. More specifically, the number of drive motors and the number of wheels may be the same so that one drive motor drives only one wheel to rotate. The number of drive motors may be different from the number of wheels so that one drive motor drives two wheels with basically coincident rotation axes. In some specific examples, the drive motor is a brushless motor. In some more specific examples, the drive motor is an outer rotor wheel hub motor.

The wheel assembly 310 includes two third rear wheels 311 and two second front wheels 312 capable of traveling on the ground, where the two third rear wheels 311 are symmetrically arranged on two sides of the rear end of the body 300 and connected through a rear connecting axle, and the two second front wheels 312 are symmetrically arranged on two sides of the front end of the body 300 and connected through a front connecting axle. The third rear wheels 311 and the second front wheels 312 are rotatable so that the all-terrain vehicle 3000 moves relative to the ground. In this example, the third rear wheel 311 includes a tire and a wheel hub motor disposed in the tire. The wheel hub motor is used for driving the tire to rotate around the rotation axis relative to the body 300 so that the all-terrain vehicle 3000 moves relative to the ground.

In this example, the total rated power P2 of the drive motor is greater than or equal to 10 kW. It is to be noted here that the total rated power of the drive motor is the sum of the power of all the drive motors used for driving the wheel assembly 310. If different drive motors (for example, the drive motors include the wheel hub motor and an electric motor of another type) separately drive different wheels of the wheel assembly 310, the total rated power of the drive motor is the sum of the power of the wheel hub motor and the power of the electric motor of another type. Specifically, it is to be noted that the total rated power of the drive motor is not the output power of the all-terrain vehicle 3000. In some specific examples, the total rated power P2 of the drive motor is greater than or equal to 10 kW and less than or equal to 40 kW, such as 10 kW, 20 kW, 30 kW, or 40 kW.

The efficiency $\eta 2$ of the drive motor is greater than 70%. In a specific example, the efficiency $\eta 2$ of the drive motor is 75%. In another specific example, the efficiency $\eta 2$ of the drive motor is 80%. In another specific example, the efficiency $\eta 2$ of the drive motor is 85%.

In the all-terrain vehicle 3000, at least part of the drive motor is disposed in the wheel so that the drive motor is directly connected to the wheel, eliminating the need for a transmission mechanism and ensuring the advantages of a simple structure, easy control, small space occupation, and low requirements for the assembly process.

It is to be noted that the cooling method of the all-terrain vehicle 3000 may be natural cooling or may be cooling by injecting oil between the wheel hub motor and the wheel.

In some specific examples, the diameter D5 of the third rear wheel 311 is greater than or equal to 15 inches and less than or equal to 30 inches, such as 15 inches, 20 inches, 25 inches, 26 inches, or 30 inches. The tire width W3 of the third rear wheel 311 is greater than or equal to 6 inches, such as 9 inches or 11 inches. The hub diameter D6 of the third rear wheel 311 is greater than or equal to 8 inches, such as 14 inches. The hub thickness T3 of the third rear wheel 311 is greater than or equal to 8 inches and less than or equal to 16 inches, such as 12 inches.

In some specific examples, the traveling speed V4 of the third rear wheel 311 is greater than or equal to 10 m/s and less than or equal to 20 m/s, such as 10 m/s, 13 m/s, 15 m/s, 17 m/s, or 20 m/s.

In some specific examples, the overall weight of the all-terrain vehicle 3000 is greater than or equal to 1090 kg and less than or equal to 1290 kg, and the overall weight here does not include the weight of a passenger. Since the weight of the passenger is generally greater than or equal to 50 kg and less than or equal to 250 kg, the overall weight of the all-terrain vehicle 3000 including the passenger is generally 1340 kg.

In some specific examples, the rotational speed of the drive motor is greater than or equal to 250 rpm and less than or equal to 1000 rpm, such as 475 rpm.

In some specific examples, the stack length of the wheel hub motor is greater than or equal to 150 mm and less than or equal to 350 mm. The outer diameter of the wheel hub motor is greater than or equal to 250 mm and less than or equal to 350 mm. The rotational speed of the wheel hub motor is less than or equal to 1000 rpm. Optionally, the rotational speed of the wheel hub motor is greater than or equal to 50 rpm and less than or equal to 1000 rpm. The torque of the wheel hub motor is greater than or equal to 50 N·m and less than or equal to 600 N·m. The slot fill factor of the wheel hub motor in a varnished state is greater than 45%. The number of slots and poles of the wheel hub motor may be 27 slots and 30 poles, 48 slots and 52 poles, 51 slots and 46 poles, or 63 slots and 56 poles. It is to be noted that when the drive motor is the wheel hub motor, to make the vibration of the wheel hub motor relatively small, the wheel hub motor with a large number of slots and a large number of poles may be selected.

In some specific examples, the maximum slope of the traveling surface on which the all-terrain vehicle 3000 can travel is greater than or equal to 10° and less than or equal to 20°, such as 15°.

In some specific examples, the torque required for the all-terrain vehicle 3000 to travel on a flat road is 75 N·m. The torque required for the snow thrower to travel on the slope is 390 N·m.

An example provides a power tool, where the power tool includes an output assembly, a body, an operating assembly, a wheel assembly, a seat, and at least one drive motor. The output assembly is used for the operation, and the body is used for supporting the output assembly. The operating assembly is used for the user to operate the power tool. The wheel assembly includes at least one wheel, and the number of wheels may be set to 1, 2, 3, 4, or more according to requirements. The seat is used for the user to sit on. At least part of the drive motor is disposed in the wheel and at least drives the wheel to move. Specifically, a motor shaft of the drive motor coincides with a rotation axis of the corresponding wheel, and the motor shaft of the drive motor is directly connected to the wheel, so as to directly drive the corresponding wheel to rotate. More specifically, the number of drive motors and the number of wheels may be the same so that one drive motor drives only one wheel to rotate. The number of drive motors may be different from the number of wheels so that one drive motor drives two wheels with basically coincident rotation axes. In some specific examples, the drive motor is a brushless motor. In some more specific examples, the drive motor is an outer rotor wheel hub motor.

In this example, the total rated power P3 of the drive motor is greater than or equal to 1000 W. It is to be noted here that the total rated power of the drive motor is the sum of the power of all the drive motors used for driving the wheel assembly. If different drive motors (for example, the drive motors include the wheel hub motor and an electric motor of another type) separately drive different wheels of the wheel assembly, the total rated power of the drive motor is the sum of the power of the wheel hub motor and the power of the electric motor of another type. Specifically, it is to be noted that the total rated power of the drive motor is not the output power of the power tool. In some more specific examples, the total rated power P3 of the drive motor is 1.3 kW.

The rated voltage U3 of the drive motor is greater than or equal to 12 V and less than or equal to 120 V. The rated voltage U4 of the power tool is greater than or equal to 18 V and less than or equal to 120 V. The efficiency $\eta 3$ of the drive motor is greater than 70%. In a specific example, the efficiency $\eta 1$ of the drive motor is 75%. In another specific example, the efficiency $\eta 1$ of the drive motor is 80%. In another specific example, the efficiency $\eta 1$ of the drive motor is 85%.

In the power tool, at least part of the drive motor is disposed in the wheel so that the drive motor is directly connected to the wheel, eliminating the need for a transmission mechanism and ensuring the advantages of a simple structure, easy control, small space occupation, and low requirements for the assembly process.

It is to be noted that the cooling method of the power tool may be natural cooling or may be cooling by injecting oil between the wheel hub motor and the wheel.

The power tool may be a riding device, and the output assembly may be a work accessory such as a snow plow, which is used for achieving the snow plowing operation or switching between multiple operations.

Specifically, the power tool may also be a riding mowing device, a riding tractor, or another riding device, and the case where the power tool is the riding mowing device is used as an example for the further detailed description below. It is to be noted in advance that the output assembly of the riding mowing device is a mowing assembly for mowing grass.

Figure 21:
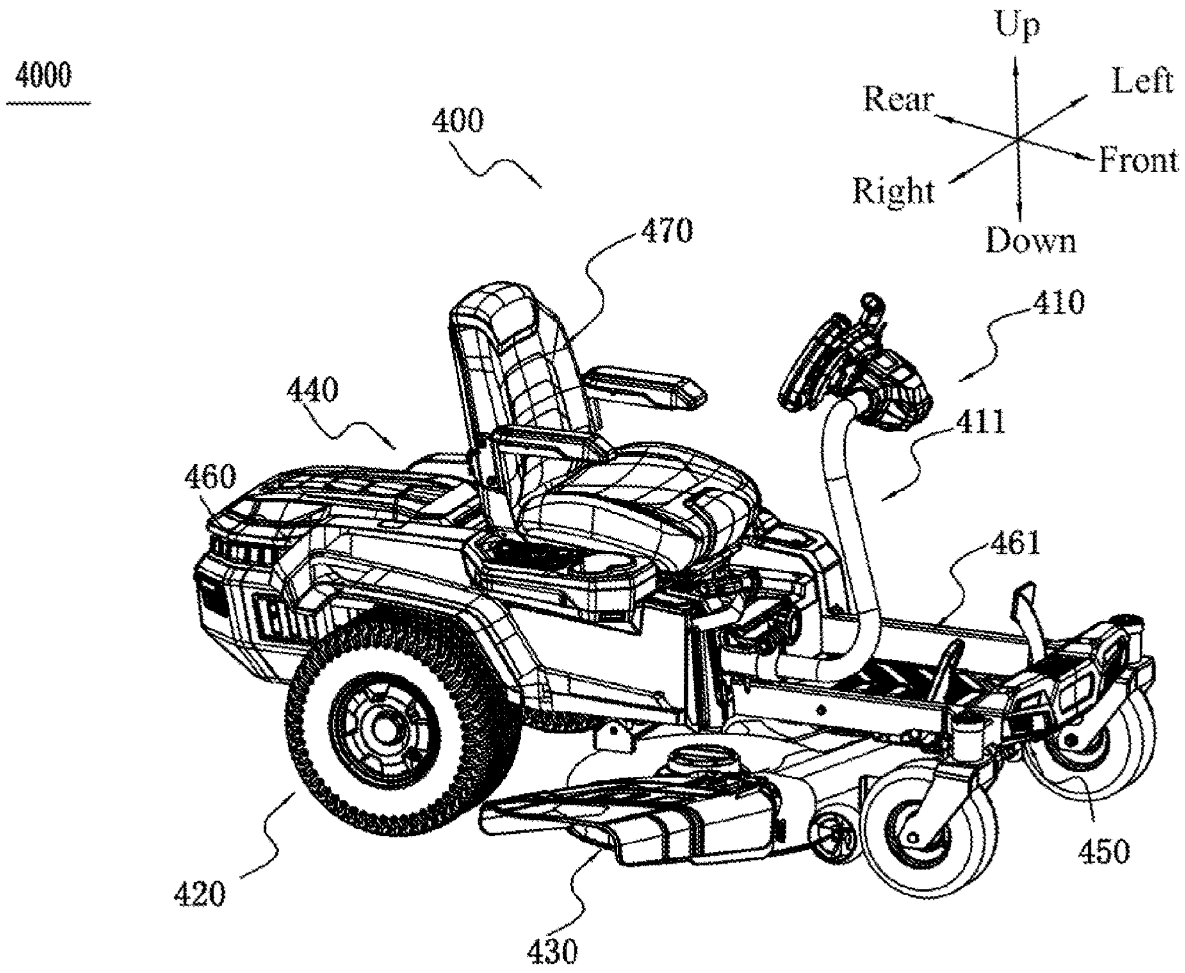
FIG. 21 is a structural view of a riding mowing device according to example three of the present application.
Figure 22:
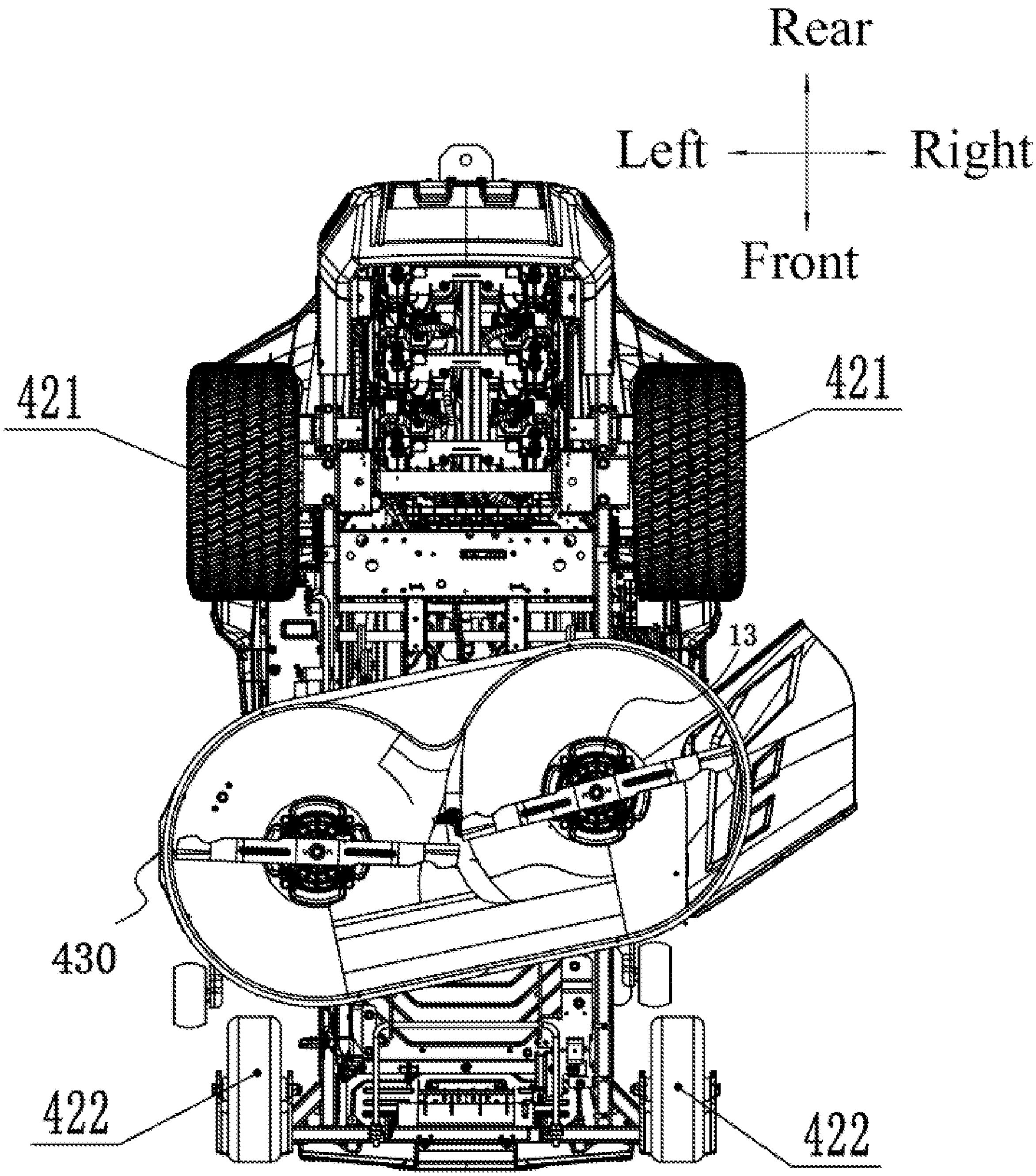
FIG. 22 is a bottom view of a riding mowing device according to example three of the present application.

As shown in FIGS. 21 and 22, a riding mowing device 4000 specifically includes a body 400, a mowing assembly 430, a seat 470, a wheel assembly 420, a power supply system 440, a lighting system 450, and an operating assembly 410. The body 400 includes a vehicle frame 461 and a body housing 460, where the vehicle frame 461 and the body housing 460 form the body 400 of the riding mowing device 4000, the body 400 is used for mounting the mowing assembly 430, the seat 470, the power supply system 440, and the lighting system 450, and the wheel assembly 420 is used for supporting the body 400. The operating assembly 410 includes a steering wheel assembly 411. In an example, the steering wheel assembly 411 includes a steering wheel operable by the user to rotate and a support rod configured to connect the steering wheel to the vehicle frame 461. The riding mowing device 4000 supplies energy to the mowing assembly 430, the wheel assembly 420, the lighting system 450, and the like through a power assembly. In this example, the power assembly of the riding mowing device 4000 is the power supply system 440 which supplies electrical energy to each assembly of the riding mowing device 4000 so that the riding mowing device 4000 may be used as the power tool. The electric riding mowing device 4000 is more environmentally friendly and more energy-efficient than a fuel-based riding mowing device.

The mowing assembly 430 includes a deck, a cutting blade, and a first motor for driving the cutting blade. The cutting blade is driven by the first motor to cut vegetation when rotating at a high speed. For example, the deck surrounds a mowing space for accommodating at least part of the cutting blade, that is to say, the cutting blade is at least partially accommodated in the deck. The first motor is used for driving the cutting blade to rotate. The mowing assembly 430 is disposed below the vehicle frame 461. In an example, two cutting blades may be provided, two first motors may be provided, and correspondingly, the two first motors separately drive the two cutting blades. In another example, three cutting blades may be provided, three first motors may be provided, and correspondingly, the three first motors separately drive the three cutting blades. The cutting blade is located in the mowing space surrounded by the deck. The mowing space is opened downward so that the cutting blade can perform a cutting operation on the vegetation below the mowing space.

The vehicle frame 461 extends basically along a front and rear direction of the riding mowing device 4000, the mowing assembly 430, the body housing 460, the seat 470, the wheel assembly 420, the power supply system 440, and the lighting system 450 are all mounted to the vehicle frame 461, and the vehicle frame 461 is used for supporting the body of the entire riding mowing device 4000. The vehicle frame 461 includes longitudinal beams and cross beams. The body housing 460 includes a left cover and a right cover, where the left cover is disposed on the left side of the seat 470, and the right cover is disposed on the right side of the seat 470.

The wheel assembly 420 is used for supporting the vehicle frame 461 so that the riding mowing device 4000 can travel on the ground. The wheel assembly 420 includes third front wheels 422 and fourth rear wheels 421. In this example, two third front wheels 422 are included, that is, a left third front wheel and a right third front wheel; and two fourth rear wheels 421 are included, that is, a left fourth rear wheel and a right fourth rear wheel. The radius of the fourth rear wheel 421 is greater than the radius of the third front wheel 422. The left third front wheel and the right third front wheel are connected through a front axle, and the left fourth rear wheel and the right fourth rear wheel are connected through a rear axle.

Figure 23:
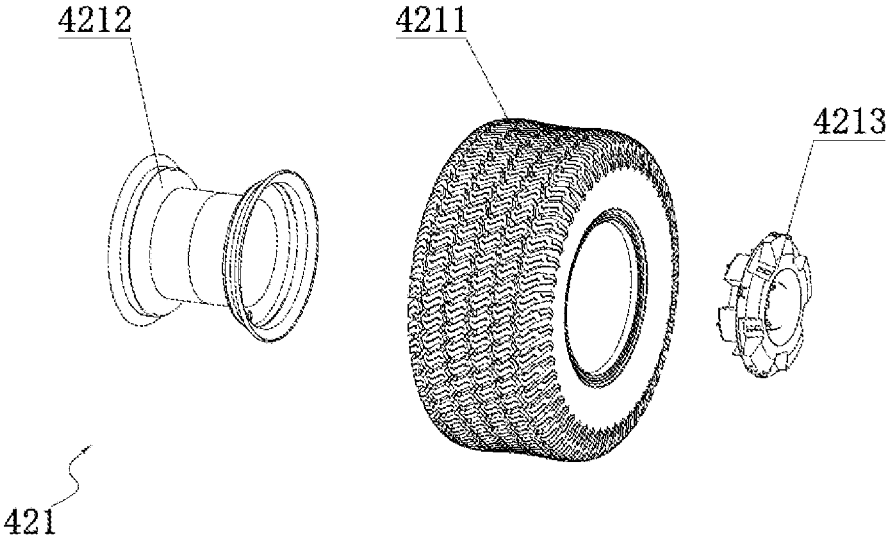
FIG. 23 is an exploded view of a fourth rear wheel of a riding mowing device according to example three of the present application.
Figure 24:
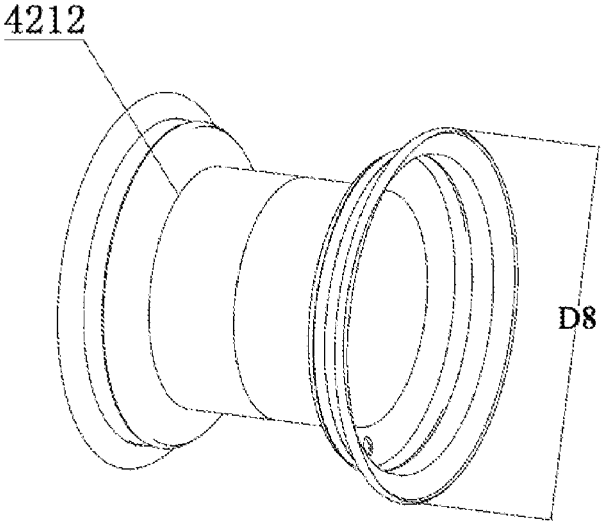
FIG. 24 is a structural view of a wheel hub motor of a riding mowing device according to example three of the present application.

In this example, as shown in FIGS. 23 and 24, the fourth rear wheel 421 includes a tire 4211 and a wheel hub motor 4212 disposed in the tire 4211. The wheel hub motor 4212 is used for driving the tire 4211 to rotate around the rotation axis relative to the body so that the riding mowing device 4000 moves relative to the ground.

The power supply system 440 is used for supplying electric power to the mowing assembly 430, the wheel assembly 420, the lighting system 450, and the like, where the first motor, the wheel hub motor 4212, and the lighting system 450 are all used as electrical devices included in the riding mowing device 4000, and the electrical devices can convert the electrical energy into other forms of energy. The power supply system 440 includes at least one battery pack for storing the electrical energy.

In some specific examples, the traveling speed of the wheels included in the wheel assembly 420 is less than or equal to 3.6 m/s.

In some specific examples, the diameter D7 of the fourth rear wheel 421 is greater than or equal to 12 inches, such as 18 inches. The tire width W4 of the fourth rear wheel 421 is greater than or equal to 5 inches, such as 7.5 inches, 8.5 inches, or 9.5 inches. The hub diameter D8 of the fourth rear wheel 421 is greater than or equal to 5 inches, such as 9 inches. The hub thickness T4 of the fourth rear wheel 421 is greater than or equal to 4 inches, such as 8 inches.

In some specific examples, the overall weight of the power tool is less than or equal to 350 kg. Optionally, the overall weight of the power tool is greater than or equal to 200 kg and less than or equal to 250 kg. In some more specific examples, when the power tool is the riding mowing device 4000, the weight of the riding mowing device 4000 is about 200 kg; and when the power tool is the riding tractor, the weight of the riding tractor is about 280 kg. It is to be noted that the overall weight here does not include the weight of the passenger. In addition, a snow removal accessory or other work accessories may be hung on the riding tractor for versatility.

In some specific examples, the rotational speed of the drive motor is greater than or equal to 9 rpm and less than or equal to 230 rpm. Optionally, the rotational speed of the drive motor is greater than or equal to 50 rpm and less than or equal to 150 rpm, such as 50 rpm, 100 rpm, or 150 rpm.

In some specific examples, the stack length of the wheel hub motor 4212 is less than or equal to 300 mm. Optionally, the stack length of the wheel hub motor 4212 is greater than or equal to 130 mm and less than or equal to 200 mm. The outer diameter of the wheel hub motor 4212 is greater than or equal to 200 mm. The rotational speed of the wheel hub motor 4212 is less than or equal to 400 rpm. Optionally, the rotational speed of the wheel hub motor 4212 is less than or equal to 250 rpm. Optionally, the rotational speed of the wheel hub motor 4212 is less than or equal to 200 rpm. Further optionally, the rotational speed of the wheel hub motor 4212 is greater than or equal to 50 rpm and less than or equal to 150 rpm. The torque of the wheel hub motor 4212 is less than or equal to 500 N·m. Optionally, the torque of the wheel hub motor 4212 is greater than or equal to 200 N·m and less than or equal to 400 N·m. The slot fill factor of the wheel hub motor 4212 in a varnished state is greater than 45%. The number of slots and poles of the wheel hub motor 4212 may be 27 slots and 30 poles, 48 slots and 52 poles, 51 slots and 46 poles, or 63 slots and 56 poles. It is to be noted that when the drive motor is the wheel hub motor 4212, to make the vibration of the wheel hub motor 4212 relatively small, the wheel hub motor 4212 with a large number of slots and a large number of poles may be selected.

In some specific examples, the maximum slope of the traveling surface on which the riding mowing device 4000 can travel is greater than or equal to 20° and less than or equal to 25°, such as 23°.

In some specific examples, the torque required for the riding mowing device 4000 to travel on a flat road is 8 N·m. The torque required for the snow thrower to travel on the slope is 280 N·m.

In some specific examples, the riding mowing device 4000 has a first mowing gear, a second mowing gear, a third mowing gear, a fourth mowing gear, and a transport gear.

In the first mowing gear, the nominal speed of the fourth rear wheel 421 is 3 mph, the traveling speed V5 of the fourth rear wheel 421 is 4.4 m/s to 5.2 m/s, and the wheel speed of the fourth rear wheel 421 is 54 rpm to 66 rpm. In the second mowing gear, the nominal speed of the fourth rear wheel 421 is 5 mph, the traveling speed V5 of the fourth rear wheel 421 is 7.4 m/s to 8.6 m/s, and the wheel speed of the fourth rear wheel 421 is 92 rpm to 108 rpm. In the third mowing gear, the nominal speed of the fourth rear wheel 421 is 6 mph, the traveling speed V5 of the fourth rear wheel 421 is 8.8 m/s to 10.2 m/s, and the wheel speed of the fourth rear wheel 421 is 110 rpm to 130 rpm. In the fourth mowing gear, the nominal speed of the fourth rear wheel 421 is 7 mph, the traveling speed V5 of the fourth rear wheel 421 is 10.2 m/s to 11.8 m/s, and the wheel speed of the fourth rear wheel 421 is 128 rpm to 152 rpm. In the transport gear, the nominal speed of the fourth rear wheel 421 is 8 mph, the traveling speed V5 of the fourth rear wheel 421 is 11 m/s to 13 m/s, and the wheel speed of the fourth rear wheel 421 is 142 rpm to 160 rpm.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A self-propelled device, comprising:

a cutting assembly for cutting;

a body for supporting the cutting assembly, the body having a connector mounting hole;

a traveling system for driving the body to move, wherein the traveling system comprises a traveling wheel and a wheel hub motor integrally disposed in the traveling wheel, the wheel hub motor having a flat structure and the external dimension of the wheel hub motor matches the external dimension of the traveling wheel, a radial length of the wheel hub motor is greater than or equal to 18 cm and less than or equal to 33 cm, and an axial thickness of the wheel hub motor is less than or equal to 3.5 cm; and a connector for detachably mounting the wheel hub motor on the body, wherein the connector comprises a wheel hub mounting hole, a first end surface facing a side of the traveling wheel, and a second end surface facing away from the side of the traveling wheel, an inner diameter of the wheel hub mounting hole mates with an outer diameter of an output shaft of the wheel hub motor, and an inner diameter of the connector mounting hole mates with an outer diameter of the connector, and wherein a limiting mechanism is disposed between the output shaft of the wheel hub motor and the connector, the limiting mechanism comprising at least one of: at least one step portion, at least one protrusion, and at least one radial dimension gradient portion, for limiting axial displacement between the output shaft and the connector.

2. The self-propelled device of claim 1, wherein at least one step portion plays a blocking role and when the at least one step portion is in contact with the connector, the output shaft of the wheel hub motor is blocked by the connector to limit the axial displacement from being generated between the output shaft and the connector.

3. The self-propelled device of claim 1, wherein the limiting mechanism further comprises an end surface limiting member, the end surface limiting member is disposed on the second end surface, the end surface limiting member engages with and is fixed to a first groove of the output shaft, and the first groove is located at a projection of the second end surface on the output shaft.

4. The self-propelled device of claim 1, wherein the limiting mechanism further comprises a rigid limiting member, and the rigid limiting member is detachably fixed to the housing of the body through a mounting assembly and the rigid limiting member is fixed to the output shaft.

5. The self-propelled device of claim 1, further comprising a first sealing mechanism, wherein the first sealing mechanism is disposed on a side of the output shaft facing the first end surface and used for sealing a contact surface between the connector and the output shaft.

6. The self-propelled device of claim 5, further comprising a second sealing mechanism, wherein the second sealing mechanism is disposed between the connector and the housing of the body and used for sealing a contact surface between the connector and the housing.

7. The self-propelled device of claim 1, further comprising a second traveling wheel and a second wheel hub motor integrally disposed in the second traveling wheel, wherein a distance between an outer end surface of the wheel hub motor integrally disposed in the traveling wheel and an outer end surface of the second wheel hub motor integrally disposed in the second traveling wheel is greater than a cutting width of the cutting assembly.

8. The self-propelled device of claim 1, wherein output power of the wheel hub motor is greater than or equal to 1 W.

9. The self-propelled device of claim 1, wherein an energy density of the wheel hub motor is greater than or equal to 0.05 W/cm3 and less than or equal to 0.5 W/cm3.

10. The self-propelled device of claim 1, wherein the at least one protrusion comprises a fixing protrusion disposed on a side of the output shaft facing the wheel hub motor and a resettable protrusion disposed on a side of the output shaft facing away from the wheel hub motor, and a distance between the fixing protrusion and the resettable protrusion matches a depth of the wheel hub mounting hole of the connector.

11. The self-propelled device of claim 1, wherein the at least one radial dimension gradient portion is a part of the output shaft that is thin in the front and thick in the rear, the wheel hub mounting hole of the connector has a structure that is thin in the front and thick in the rear, and the output shaft cannot continue penetrating the wheel hub mounting hole of the connector when a radial dimension of the output shaft is greater than a radial dimension of the wheel hub mounting hole.

12. A smart mower, comprising:

a cutting assembly for cutting;

a body for supporting the cutting assembly, the body having a connector mounting hole; and a traveling system for driving the body to move, wherein the traveling system comprises a traveling wheel and a wheel hub motor integrally disposed in the traveling wheel, the wheel hub motor has a flat structure and the external dimension of the wheel hub motor matches the external dimension of the traveling wheel, a radial length of the wheel hub motor is greater than or equal to 18 cm and less than or equal to 33 cm, and an axial thickness of the wheel hub motor is less than or equal to 3.5 cm.

* * * * *